US010512220B2

(12) United States Patent
Kirsch et al.

(10) Patent No.: US 10,512,220 B2
(45) Date of Patent: Dec. 24, 2019

(54) HOP PICKING MACHINE

(71) Applicant: DK Fab, Inc., Woodburn, OR (US)

(72) Inventors: Daniel Kirsch, Woodburn, OR (US);
Edward J. Charron, Aumsville, OR (US)

(73) Assignee: DK Fab, Inc., Woodburn, OR (US)

( * ) Notice: Subject to any disclaimer, the term of this patent is extended or adjusted under 35 U.S.C. 154(b) by 133 days.

(21) Appl. No.: 15/684,554

(22) Filed: Aug. 23, 2017

(65) Prior Publication Data

US 2018/0054972 A1 Mar. 1, 2018

Related U.S. Application Data

(60) Provisional application No. 62/378,598, filed on Aug. 23, 2016.

(51) Int. Cl.
*A01D 46/02* (2006.01)
*A01G 3/00* (2006.01)
*A01G 17/02* (2006.01)

(52) U.S. Cl.
CPC ............... *A01D 46/02* (2013.01); *A01G 3/00* (2013.01); *A01G 17/02* (2013.01)

(58) Field of Classification Search
CPC ........ A01D 45/22; A01D 45/24; A01D 46/00; A01D 46/005; A01D 46/02; A01D 46/28; A01D 46/285; A01G 17/02; A01F 29/04
See application file for complete search history.

(56) References Cited

U.S. PATENT DOCUMENTS

| | | | |
|---|---|---|---|
| 1,054,551 A | 2/1913 | Horst | |
| 2,240,066 A * | 4/1941 | Bingham | A01D 45/22 172/28 |
| 2,536,927 A | 1/1951 | Griswold | |
| 2,611,370 A * | 9/1952 | Key | A23N 15/10 460/123 |
| 2,681,066 A | 6/1954 | Dauenhauer | |
| 2,763,114 A * | 9/1956 | Carruthers | A01D 45/24 460/134 |
| 2,808,056 A * | 10/1957 | Scheel | A01D 45/24 460/113 |
| 3,927,680 A | 12/1975 | Stefan et al. | |
| 3,935,867 A | 2/1976 | Richardson | |
| 6,769,981 B1 | 8/2004 | Perrault et al. | |
| 2012/0083321 A1 | 4/2012 | Fuß et al. | |

* cited by examiner

*Primary Examiner* — Alicia Torres
(74) *Attorney, Agent, or Firm* — Klarquist Sparkman, LLP

(57) ABSTRACT

A hop picking machine has a conveyor configured to receive hop vines, and a first cutting assembly including a plurality of blade assemblies spaced apart from one another across a width of the conveyor and extending upwardly relative to a plane of the conveyor. The blade assemblies include respective cutter bar members having blades mounted thereon such that the blades are oriented opposite to a direction of travel of the conveyor, and such that hop vines conveyed by the conveyor to the first cutting assembly can be cut by the blades. A second cutting assembly has a plurality of rotatable cutting members configured to receive hop vine segments from the first cutting assembly along the direction of travel of the conveyor.

15 Claims, 19 Drawing Sheets

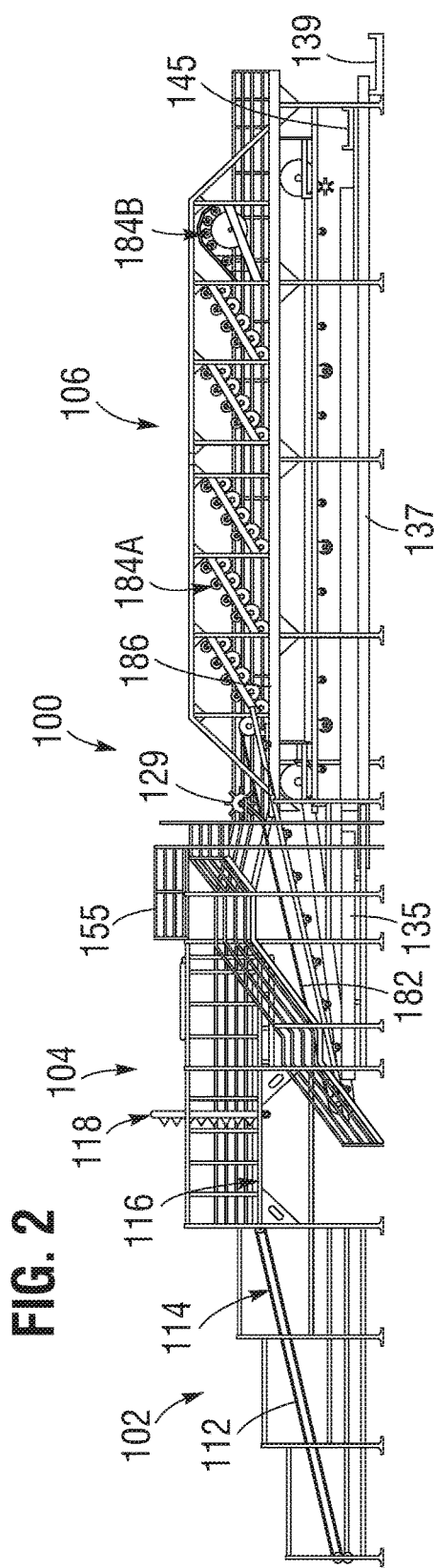
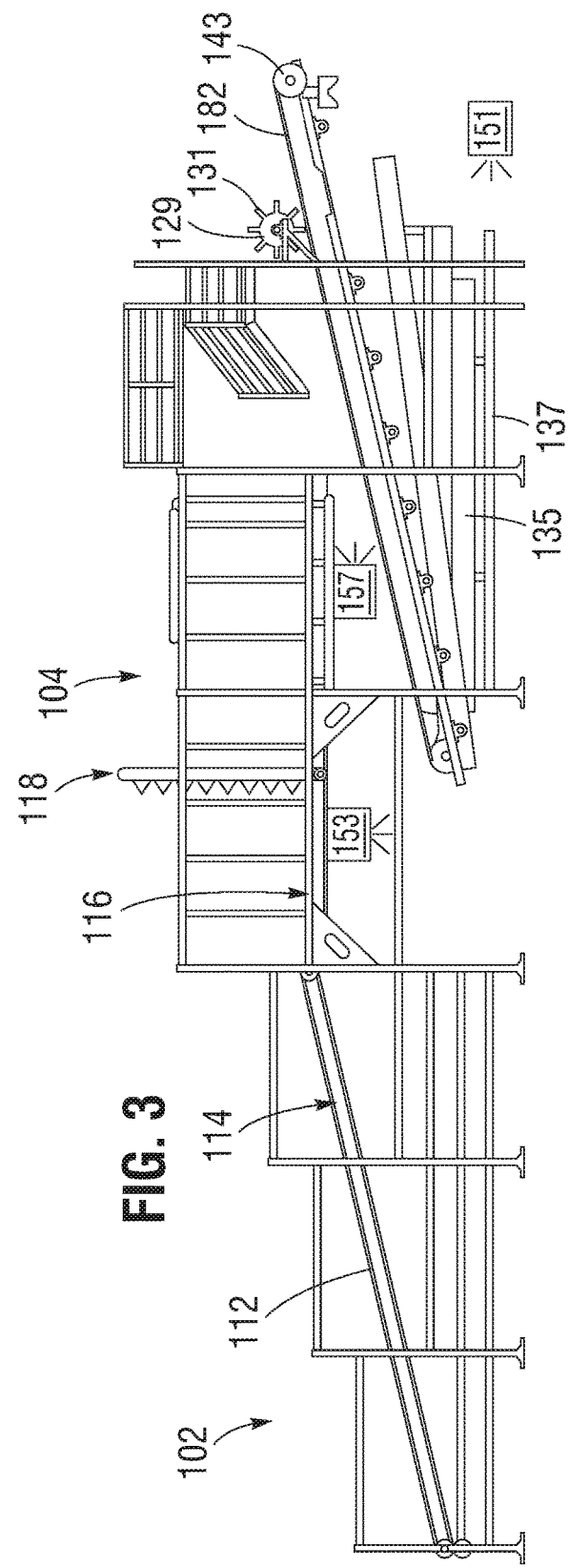

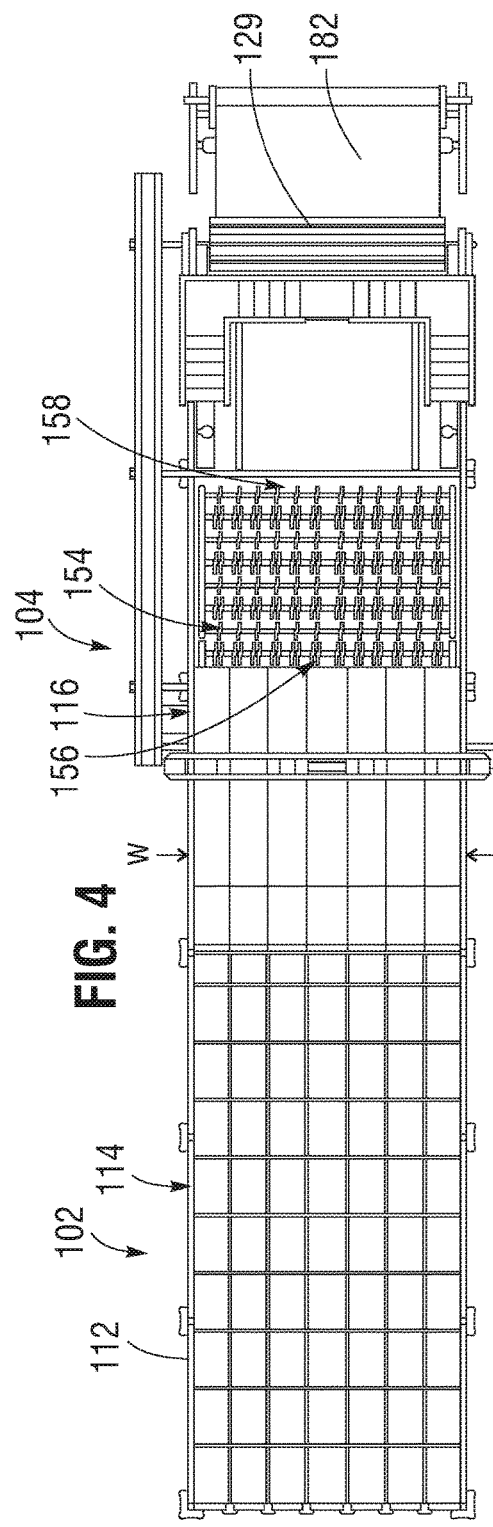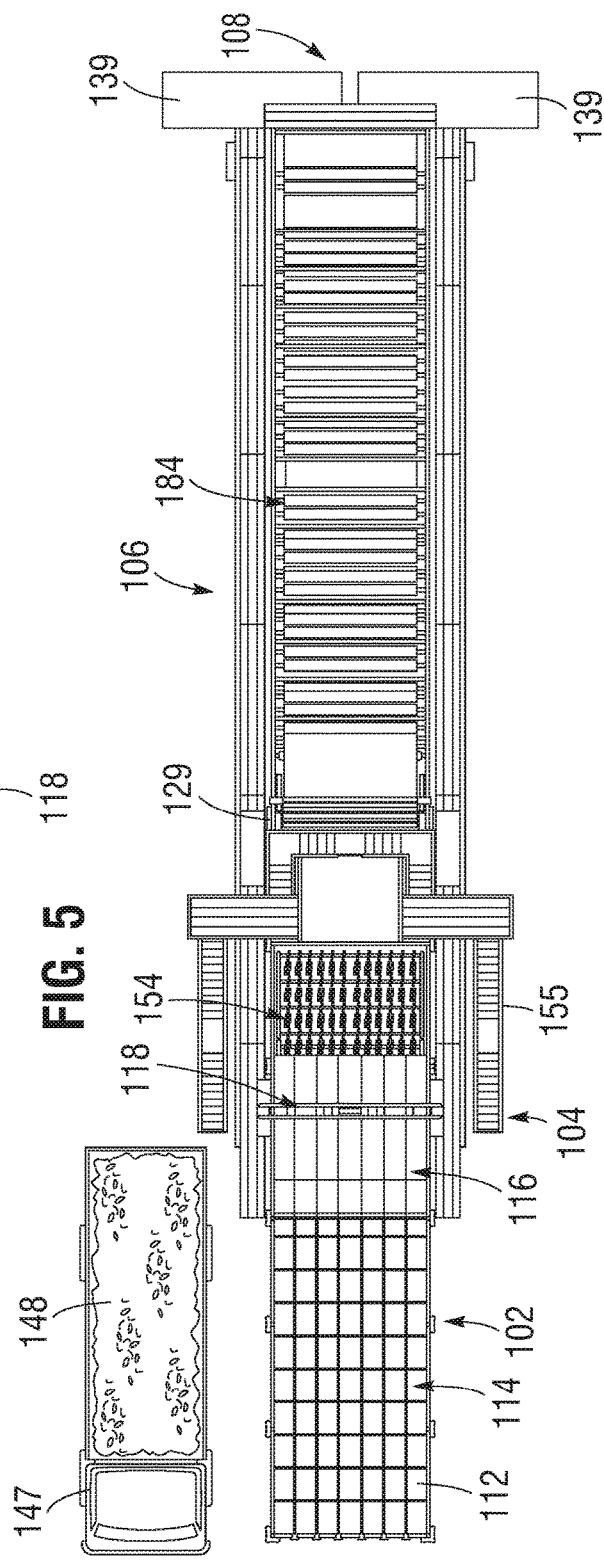

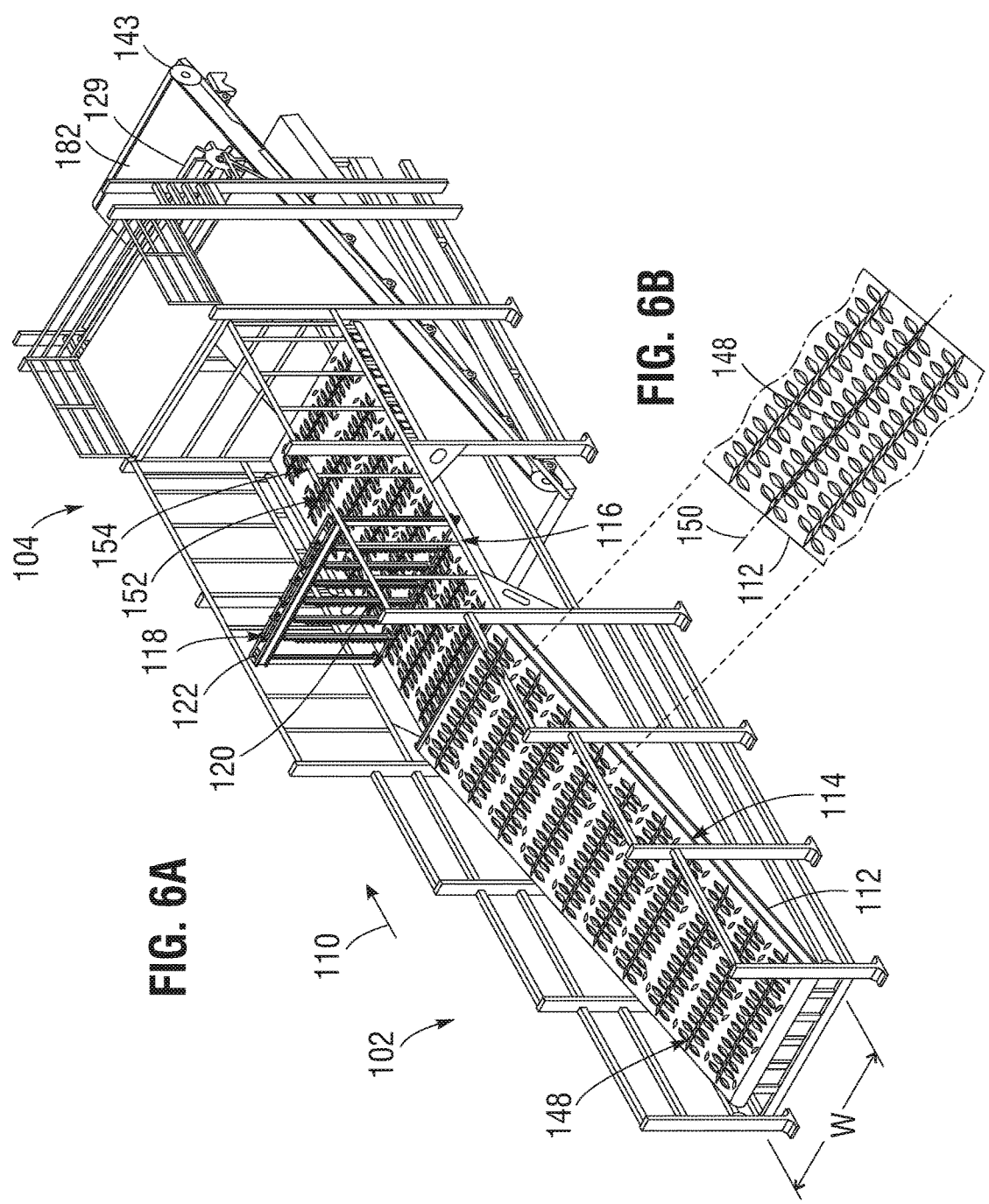

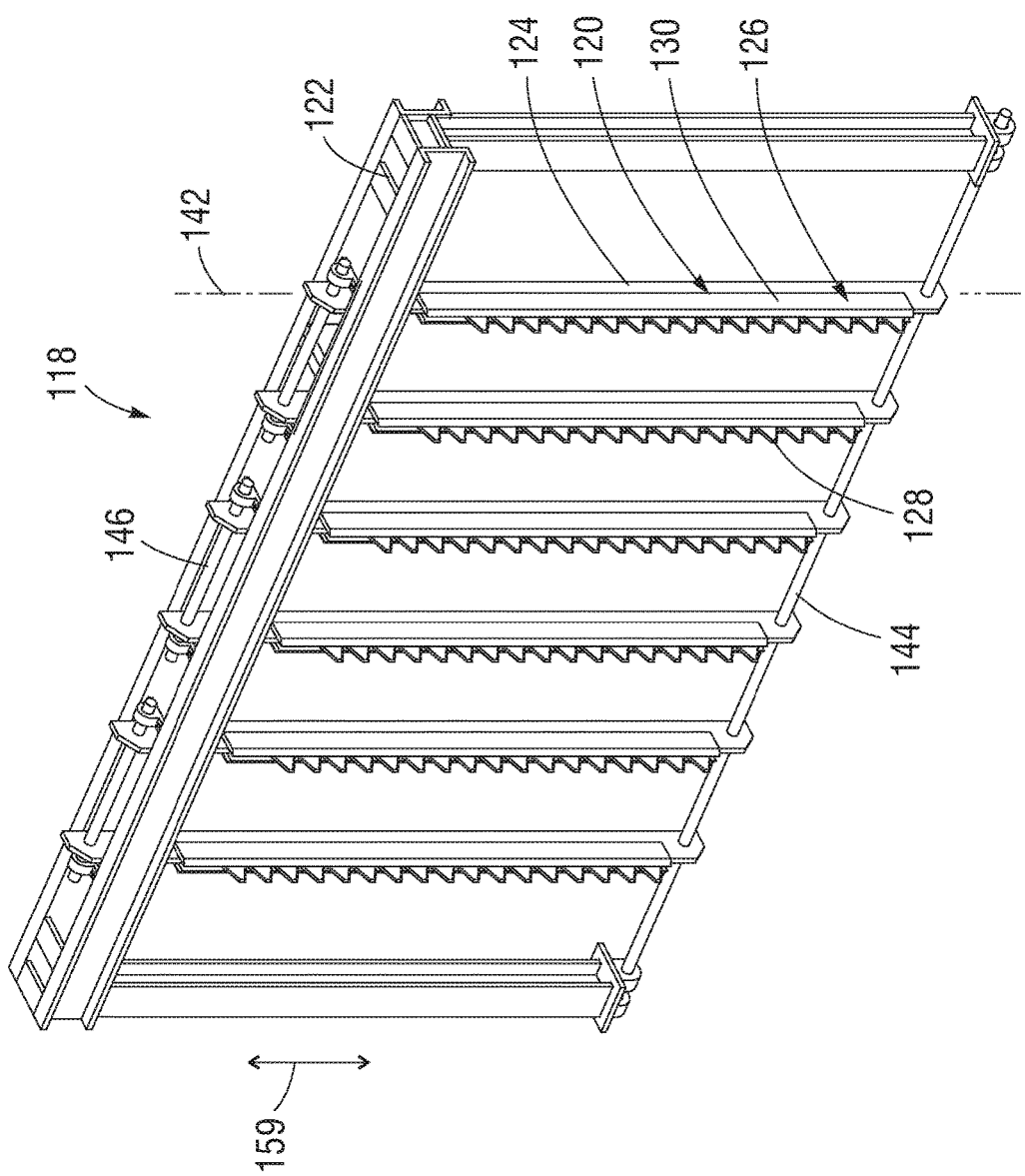

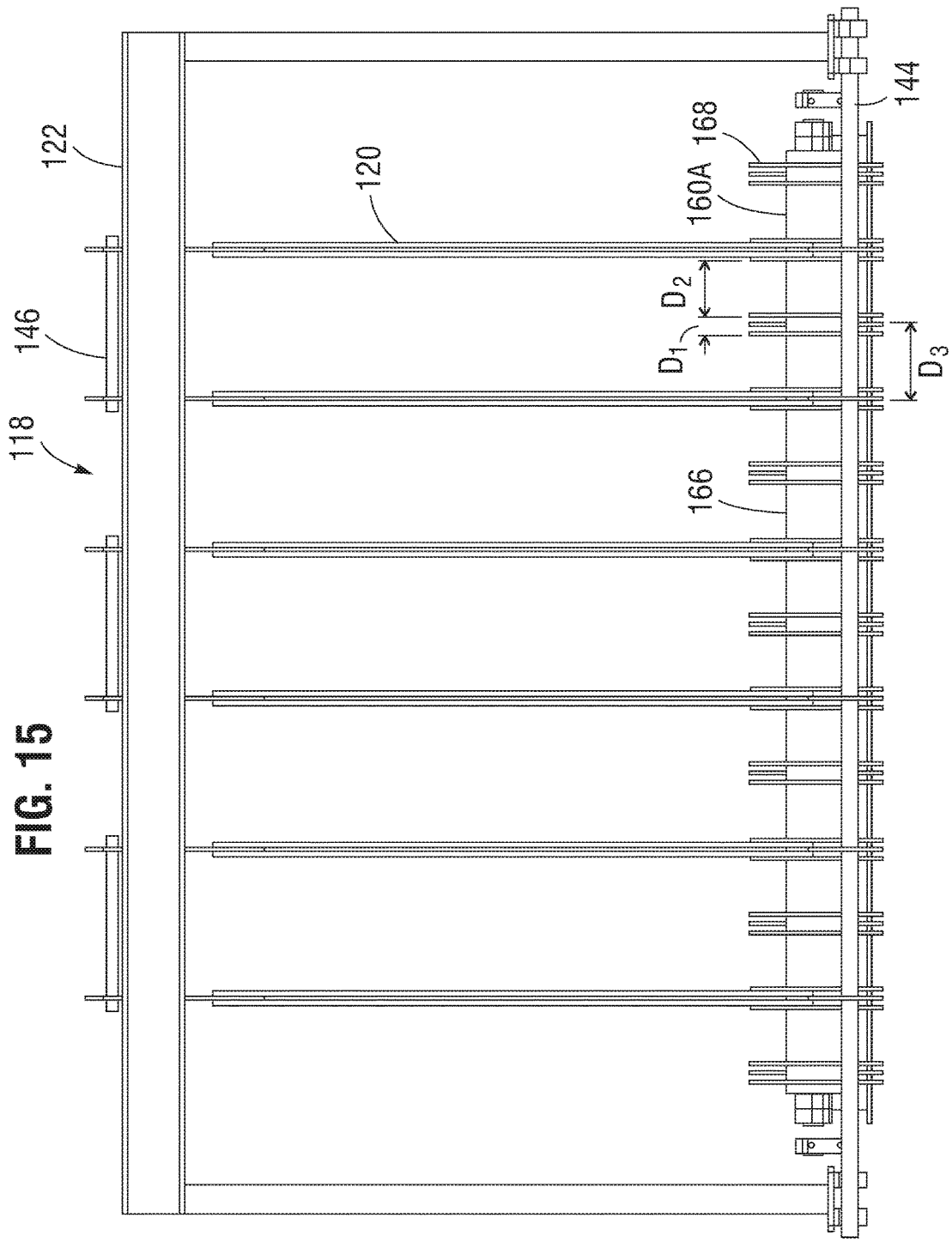

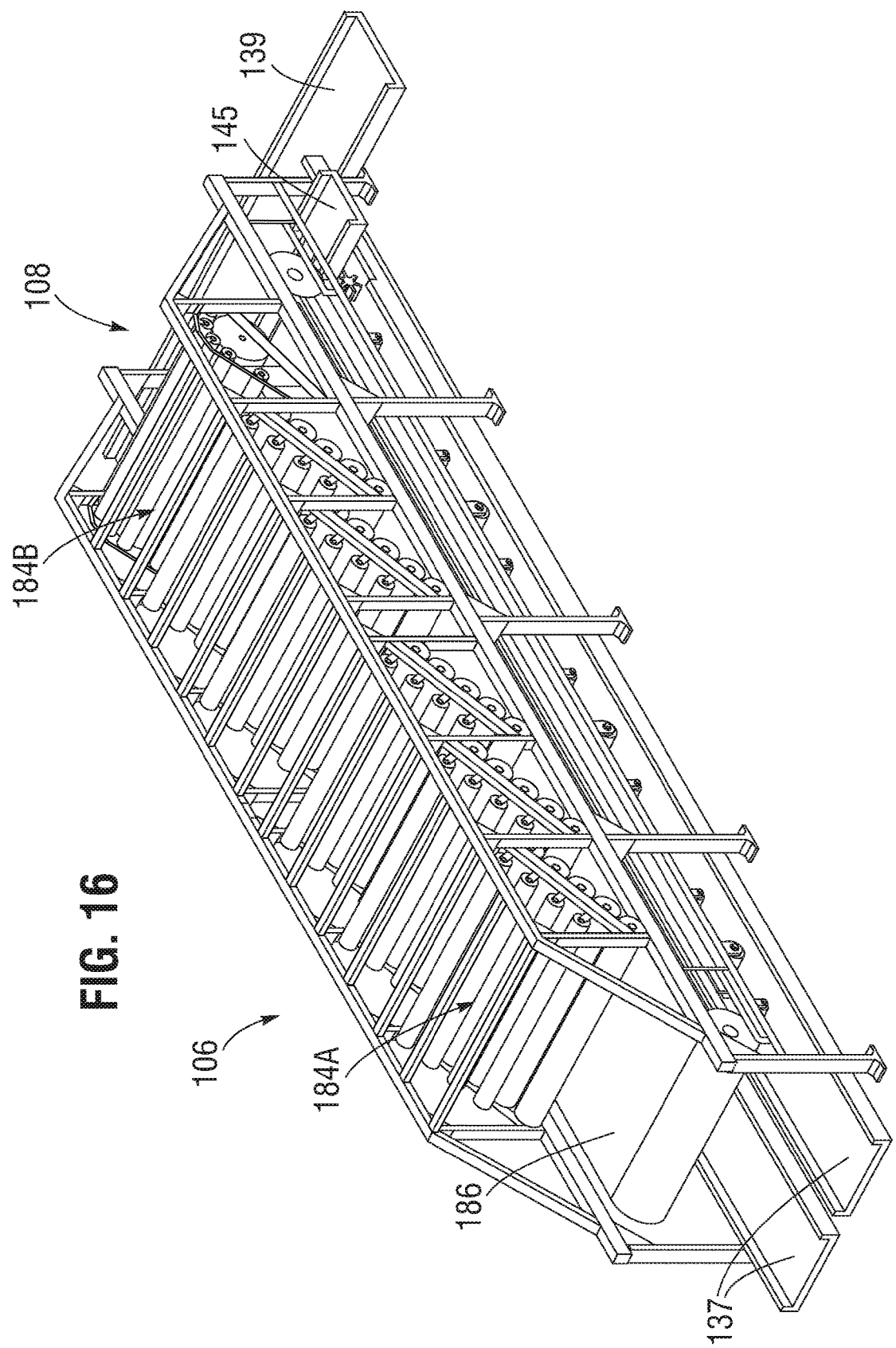

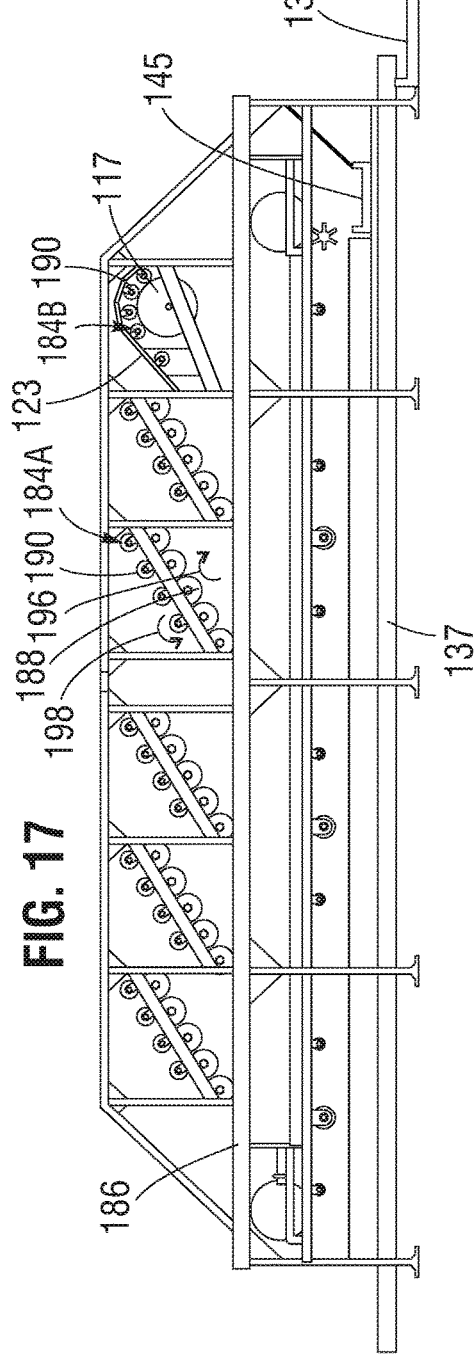
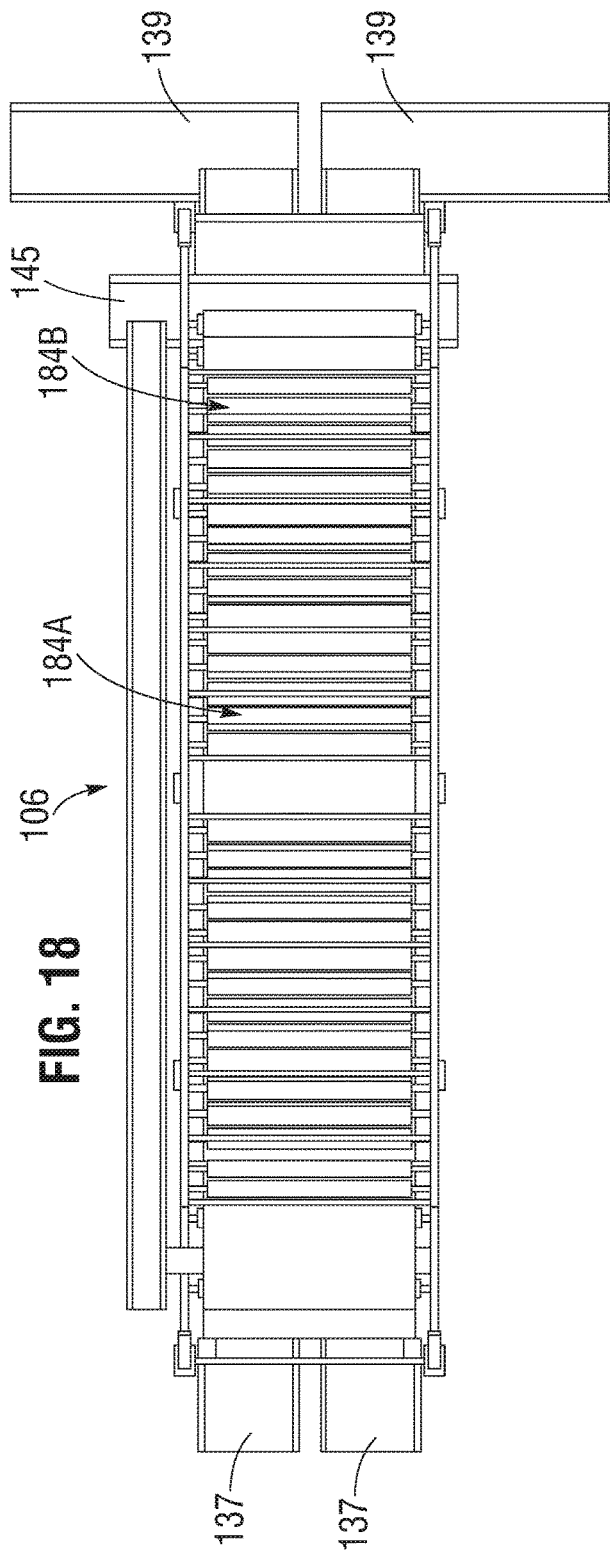

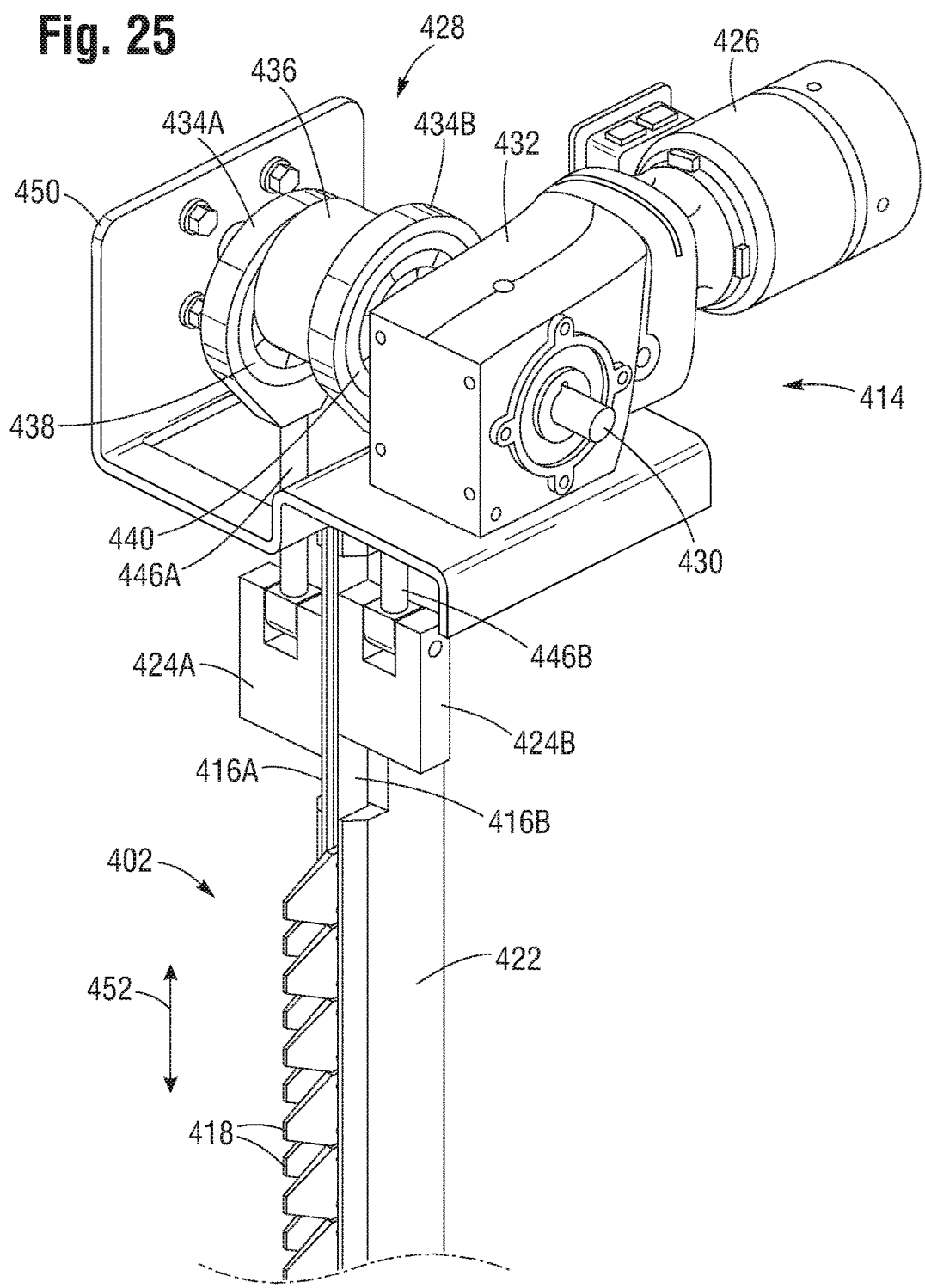

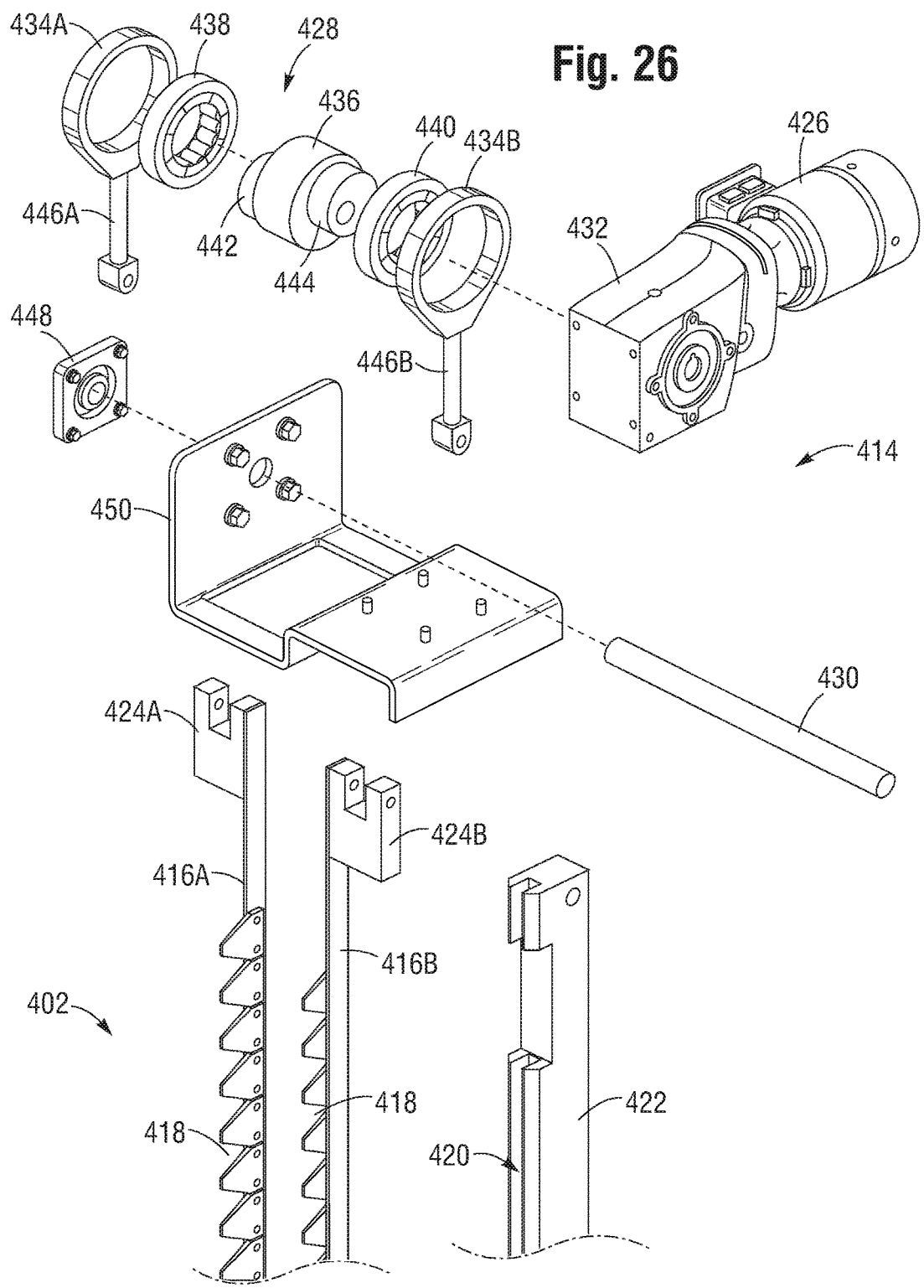

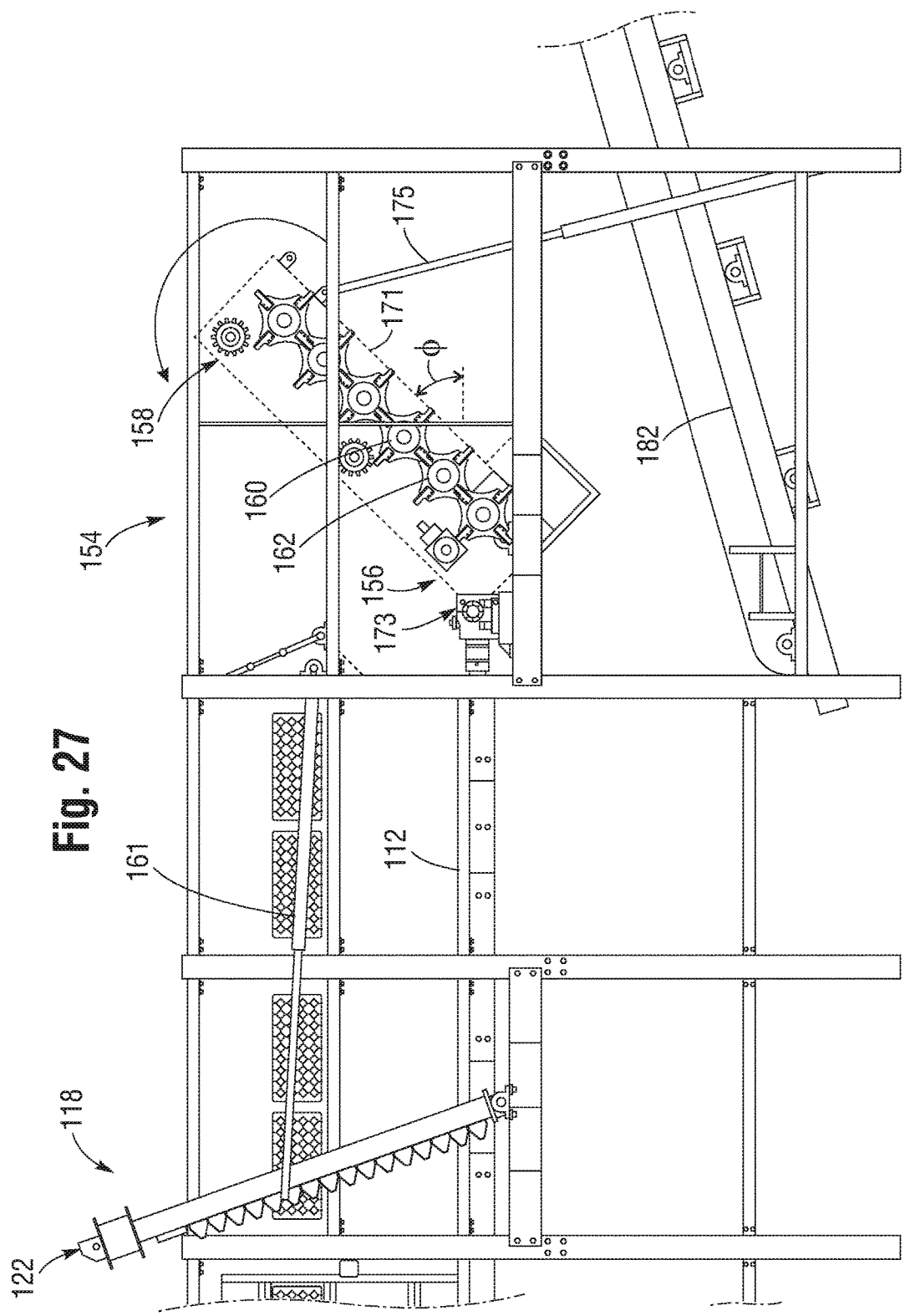

HOP PICKING MACHINE

CROSS REFERENCE TO RELATED APPLICATION

This application claims the benefit of U.S. Provisional Application No. 62/378,598, filed on Aug. 23, 2016, which is incorporated herein by reference in its entirety.

FIELD

The present application concerns systems and methods for processing agricultural products and, in particular embodiments, hop vines and hop cones.

BACKGROUND

Hop vines are typically grown on trellises, and harvested by cutting the vines away from the trellises at or near ground level. The hop cones are then picked from the hop vines, typically by hanging the whole hop vines from hooks, or processing the hop vines with machinery. Although taxonomically classified as "bines" because of their stout stems and hairs to aid in climbing, hop stems are interchangeably referred to herein as both "vines" and "bines." Known machines process the hop vines in batches, resulting in increased time and labor required to pick the hop cones. Accordingly, there is a need for improvements to hop picking machines.

SUMMARY

Certain embodiments of the application concern machines for separating hops from hop vines. In a representative embodiment, an apparatus comprises a conveyor configured to receive hop vines, and a first cutting assembly including a plurality of blade assemblies spaced apart from one another across a width of the conveyor and extending upwardly relative to a plane of the conveyor. The blade assemblies include respective cutter bar members having blades mounted thereon such that the blades are oriented opposite to a direction of travel of the conveyor, and such that hop vines conveyed by the conveyor to the first cutting assembly can be cut by the blades. The apparatus further comprises a second cutting assembly including a plurality of rotatable cutting members configured to receive hop vine segments from the first cutting assembly along the direction of travel of the conveyor.

In another representative embodiment, a method comprises receiving hop vines on a conveyor such that longitudinal axes of the hop vines are oriented substantially perpendicular to a direction of travel of the conveyor, and conveying the hop vines along the conveyor to a cutting assembly. The method further comprises cutting the hop vines along the longitudinal axes of the hop vines into hop vine segments with the cutting assembly, and picking hop cones from the hop vine segments with one or more picking assemblies.

In another representative embodiment, a system comprises a conveyor configured to receive hop vines, and a first cutting assembly including a plurality of blade assemblies spaced apart from one another across a width of the conveyor and extending upwardly from a plane of the conveyor. The blade assemblies including respective cutter bar members having blades mounted thereon such that the blades are oriented opposite to a direction of travel of the conveyor, and such that hop vines conveyed by the conveyor to the first cutting assembly can be cut by the blades. The system further comprises a second cutting assembly including a plurality of rotatable cutting members configured to receive hop vine segments from the first cutting assembly along the direction of travel of the conveyor, and a controller. The controller is operable to transmit control signals to cause the conveyor to convey hop vines along the direction of travel to the first cutting assembly, and transmit control signals to cause the first cutting assembly to cut the hop vines along longitudinal axes of the hop vines into hop vine segments. The controller is further operable to transmit control signals to cause the rotatable cutting members of the second cutting assembly to cut at least a portion of the hop vine segments.

The foregoing and other objects, features, and advantages of the disclosed technology will become more apparent from the following detailed description, which proceeds with reference to the accompanying figures.

BRIEF DESCRIPTION OF THE DRAWINGS

FIG. 2 is a side elevation view of the hop picking machine of FIG. 1.

FIG. 3 is a side elevation view of the infeed portion and the cutting portion of the hop picking machine of FIG. 1.

FIG. 4 is a top plan view of the infeed and cutting portions of the hop picking machine of FIG. 1.

FIG. 5 is a top plan view of the hop picking machine of FIG. 1.

FIG. 6A is a perspective view of the infeed and cutting portions of the picking machine of FIG. 1.

FIG. 6B is a detail view of the infeed conveyor of FIG. 6A.

FIG. 7 is a perspective view of a representative embodiment of a cutting assembly including a plurality of blade assemblies.

FIG. 15 is a front elevation view of the first and second cutting assemblies of the embodiment of FIG. 1.

FIG. 16 is a perspective view of a picking portion of the embodiment of FIG. 1.

FIG. 17 is a side elevation view of the picking portion of FIG. 16.

FIG. 18 is a top plan view of the picking portion of FIG. 16.

FIG. 25 is a perspective view of a representative example of one of the reciprocating blade assemblies of FIG. 24 and the associated drive assembly.

FIG. 26 is an exploded view of the blade assembly and the drive assembly of FIG. 25.

FIG. 27 is a side elevation view illustrating pivoting motion of the second cutting assembly of FIG. 1.

DETAILED DESCRIPTION

Figure 1:
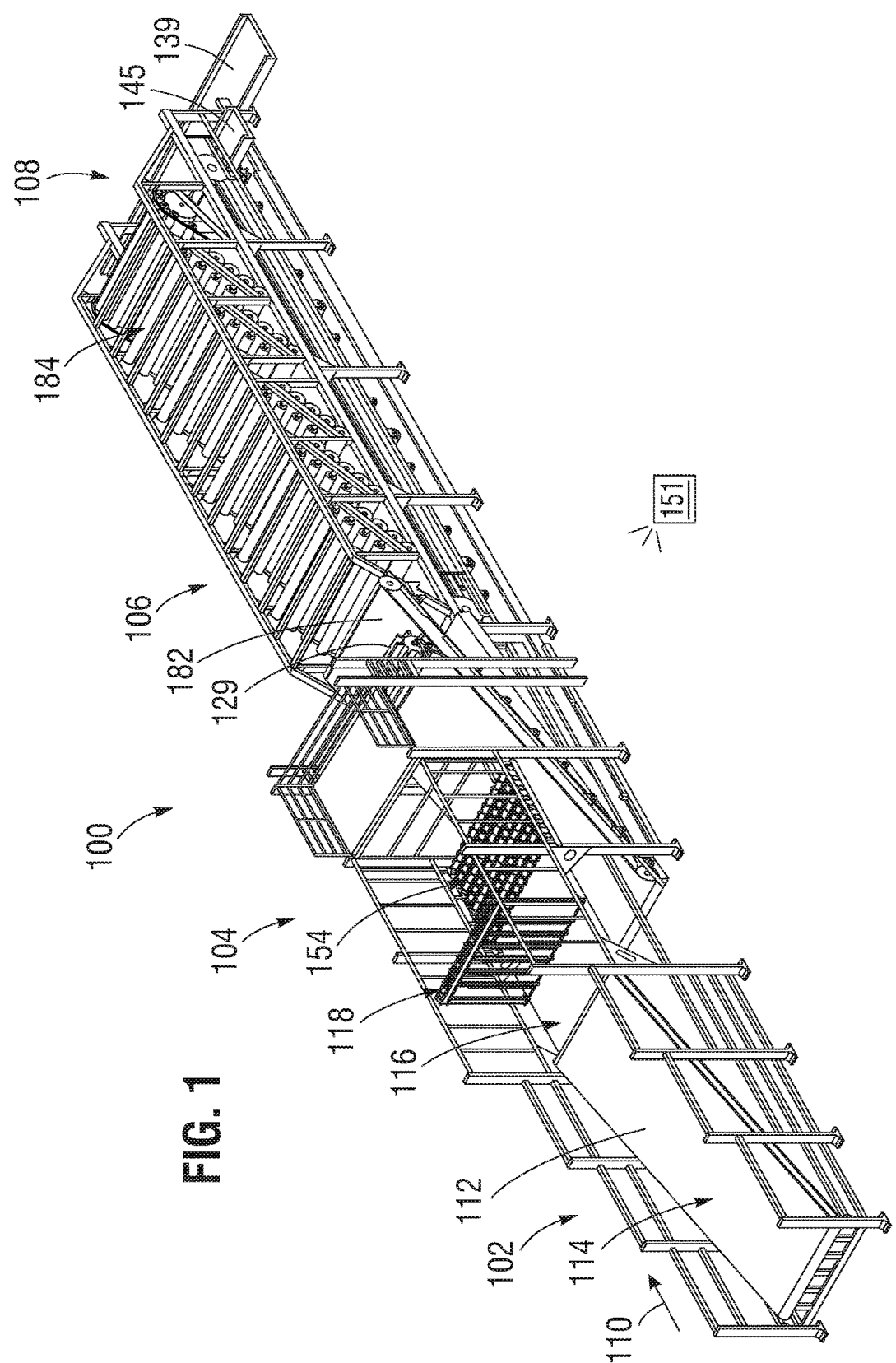
FIG. 1 is a perspective view of a representative embodiment of a hop picking machine.

FIG. 1 illustrates a representative embodiment of a machine 100 configured to process agricultural products, and in particular harvested hop vines. In the illustrated embodiment, the machine can include a loading or infeed end portion 102, a hop vine cutting portion 104, a hop cone picking or harvesting portion 106, and a discharge end portion 108. Hop vines or other products processed by the machine can move through the machine in the direction indicated by arrow 110 from the loading portion 102, through the cutting portion 104 and the picking portion 106, and can be discharged from the discharge portion 108 for further processing.

The loading portion 102 can include a first conveyor 112 (also referred to as an "infeed conveyor"), which is shown schematically in FIG. 1. In the illustrated embodiment, a first portion 114 of the infeed conveyor can be inclined relative to the ground, and a second portion 116 of the infeed conveyor can be elevated and substantially parallel to the ground, although other configurations are possible. The second portion 116 of the infeed conveyor 102 can extend into the hop vine cutting portion 104. In some embodiments, the infeed conveyor 102 can be, for example, a draper belt or chain that is moved along a floor or other surface to convey material along the surface, or any other suitable conveyor system. The first and second portions 114, 116 of the infeed conveyor can be a single conveyor or separate conveyors, as desired.

Referring to FIGS. 6A and 6B, the infeed conveyor 112 can be configured to receive hop vines 148 with their longitudinal axes 150 (FIG. 6B) oriented substantially perpendicular to a direction of travel of the conveyor (indicated by arrow 110). In other words, hop vines 148 can be received on the infeed conveyor 112 such that the longitudinal axes 150 of the hop vines are substantially parallel to a width dimension W of the infeed conveyor, and can be conveyed along the infeed conveyor to the hop vine cutting portion 104 of the machine in this orientation. In some implementations, hop vines can be received on the conveyor in a single layer, or in multiple layers such that the hop vines form a bed (see, e.g., FIG. 10). In some embodiments, the infeed conveyor can include a leveling device, such as a leveling drum, which can spread hop vines received on the conveyor to a specified depth.

As shown in FIGS. 1-6B, the hop vine cutting portion 104 can include a first cutting assembly 118. In the illustrated embodiment, the first cutting assembly 118 includes a plurality of blade assemblies 120 (also referred to herein as cutting members) mounted to a frame portion 122 extending across the infeed conveyor 112. As best shown in FIGS. 1, 6A, and 7, the cutting members or blade assemblies 120 can be spaced apart from one another across the width dimension W of the infeed conveyor 112 and, more particularly, across the second portion 116 of the infeed conveyor. In this manner, hop vines 148 conveyed through the cutting portion 104 of the machine can be cut by the cutting members or blade assemblies 120 perpendicular to their longitudinal axes into hop vine segments 152. The hop vine segments 152 can have lengths substantially equal to the spacing between the cutting members or blade assemblies 120. For example, in certain embodiments the first cutting assembly can be configured to cut the hop vines 148 into hop vine segments 152 having lengths of 30 inches.

FIGS. 7-10 illustrate the blade assemblies 120 in greater detail. In the illustrated embodiment, the blade assemblies 120 can include guide members 124 coupled to the frame portion 122 at both ends. The guide members 124 can include respective mounting portions 126 configured to receive a plurality of blades 128. In the illustrated embodiment, the mounting portions 126 can comprise two mounting plates 130 mounted on opposite sides of the guide members and defining a groove 132 (FIG. 8) therebetween. In this manner, the blades 128 can be releasably secured (e.g., by fasteners) between the mounting plates 130, allowing individual blades to be removed and/or replaced. In some embodiments, the blades 128 can be secured to one or more cutter bar members disposed within the grooves 132, as described in greater detail with reference to FIGS. 24-26. In other embodiments, the blades 128 can secured to, for example, the mounting plates 130, and/or to the guide members 124.

Figure 8:
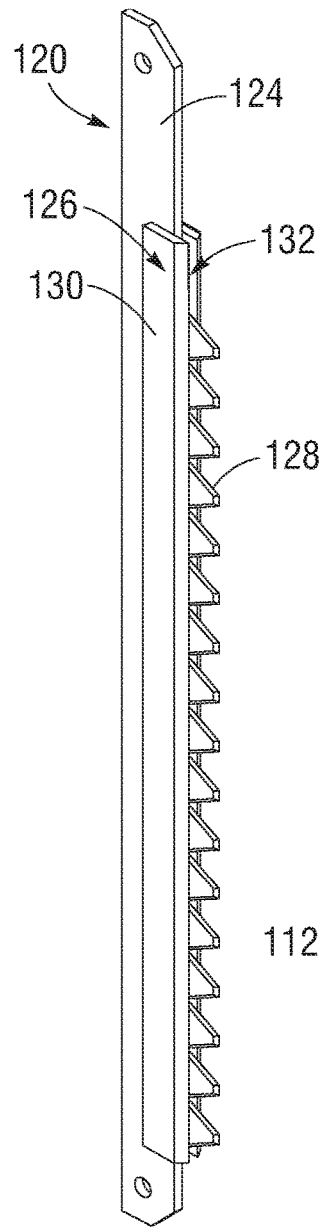
FIG. 8 is a perspective view of a blade assembly of the cutting assembly of FIG. 7.
Figure 9:
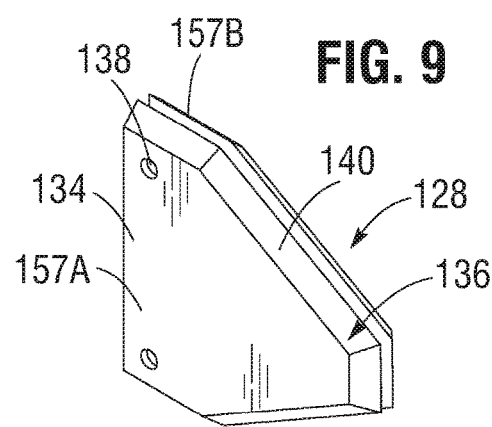
FIG. 9 is a perspective view of a blade member of the blade assembly of FIG. 8.

Referring to FIG. 9, the blades 128 can be configured as sickle blades, and can have separable halves 157A, 157B each have a mounting or base portion 134, and a blade portion 136. In the illustrated embodiment, the base portion 134 can define one or more openings 138 for receiving fasteners, and the blade portion 136 can have sharpened edges 140 arranged, for example, in a triangular shape. The blade assemblies 120 can be positioned such that the cutting edges 140 of the blades are oriented opposite to the direction of travel of the infeed conveyor 112, such that hop vines conveyed to the cutting assembly can be cut by the blades. As best shown in FIGS. 7 and 8, the blades 128 can be arranged along the long axis of the blade assemblies 120 in the manner of a sickle bar. In other embodiments, the blades 128 can be unibody, monolithic structures.

In the illustrated embodiment, the blade assemblies 120 can be oriented such that longitudinal axes 142 (FIG. 7) of the blade assemblies are substantially perpendicular to a plane of the conveyor 112 defined at the location of the first cutting assembly. For example, with reference to FIG. 6A, the blade assemblies 120 can be oriented substantially perpendicular to the second portion 116 of the conveyor 112.

In some embodiments, the blades 128 can be movable relative to the frame 122 and/or to the conveyor 112 to facilitate cutting of the hop vines. For example, in embodiments in which the blades 128 are coupled to cutter bar members (see FIGS. 24-26), the cutter bar members can be configured to reciprocate along their respective longitudinal axes relative to the plane of the conveyor in the directions of double-headed arrow 159. In the configuration illustrated in FIG. 7, the guide members 124 can be mounted to a shaft 144 at the lower end of the frame 122, and pairs of adjacent guide members can be coupled to respective shafts 146 at the top of the frame. In some embodiments, the blade assemblies 120 can include eccentric mounts incorporated on the shafts 146 such that rotational motion of the shafts 146 causes reciprocating motion of the blades 128 relative to the plane of the conveyor. In other embodiments, the blade assemblies 120 can be coupled to a common shaft at the top of the frame. It should also be understood that any suitable number of blade assemblies 120 can be coupled to the shafts 146, including more than two blade assemblies, or a single blade assembly, as desired.

Figure 24:
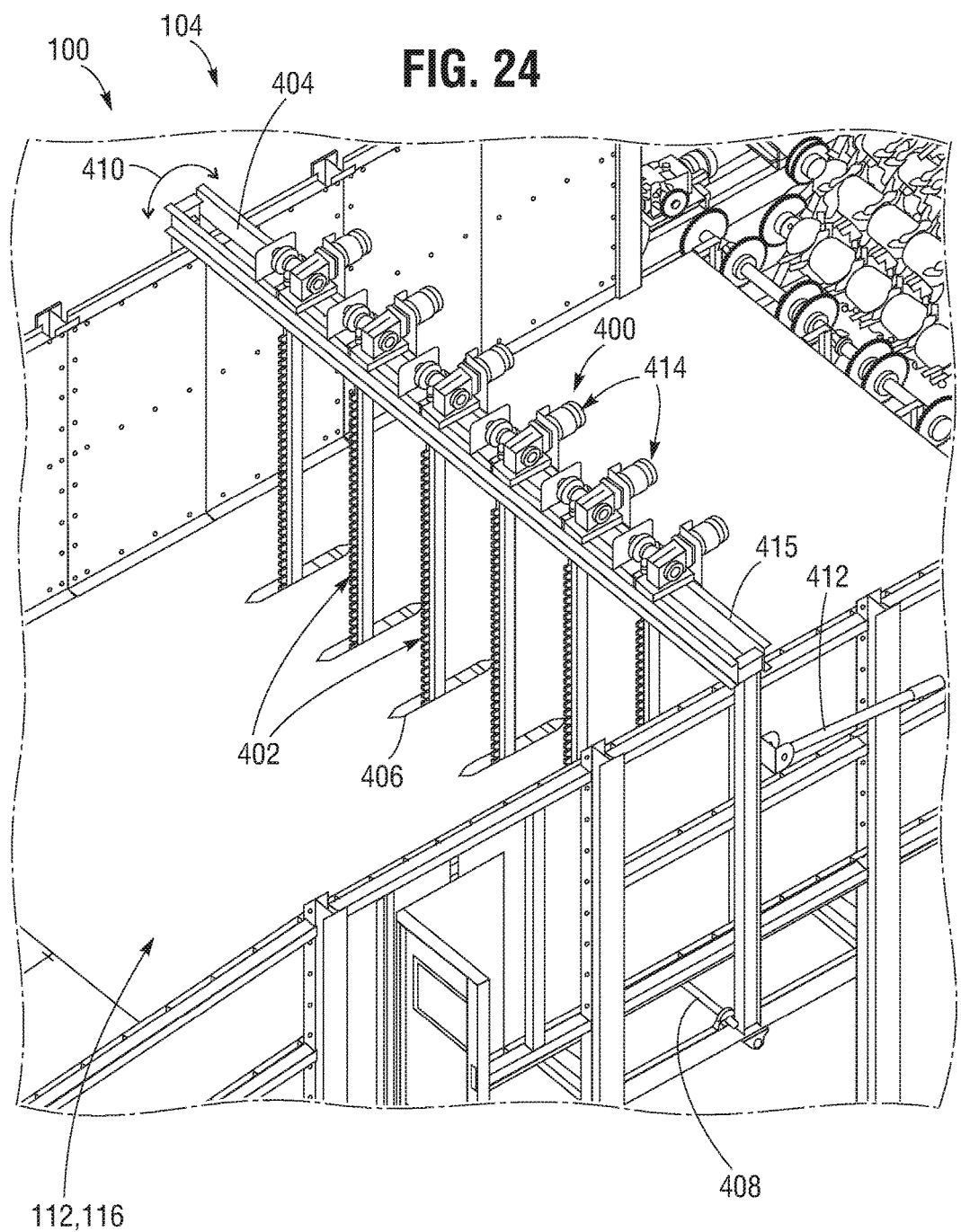
FIG. 24 is a perspective view of another embodiment of a cutting assembly including a plurality of reciprocating blade assemblies.

In some embodiments, the guide members 124 of the blade assemblies 120 can be stationary, and the blades 128 can be movable along the longitudinal axes of the blade assemblies (e.g., by cutter bar members described at FIGS. 24-26). In some embodiments, each of the blade assemblies can include two sets of blades, or a set of blades and a set of guards. One or both sets of blades and/or guards can be movable relative to the other along the longitudinal axes of the blade assemblies to cut hop vines conveyed to the cutting assembly. In alternative embodiments, the blade assemblies 120 can comprise continuous blade edges positioned along the side of the blade assemblies and facing opposite the direction of travel of the conveyor. In further alternative embodiments, the blade assemblies can comprise any of various other blade or saw configurations, such as band saws, rotating or circular saws, etc., oriented such that the hop vines conveyed to the blade assemblies 120 can be incident upon the respective blade surfaces.

Figure 10:
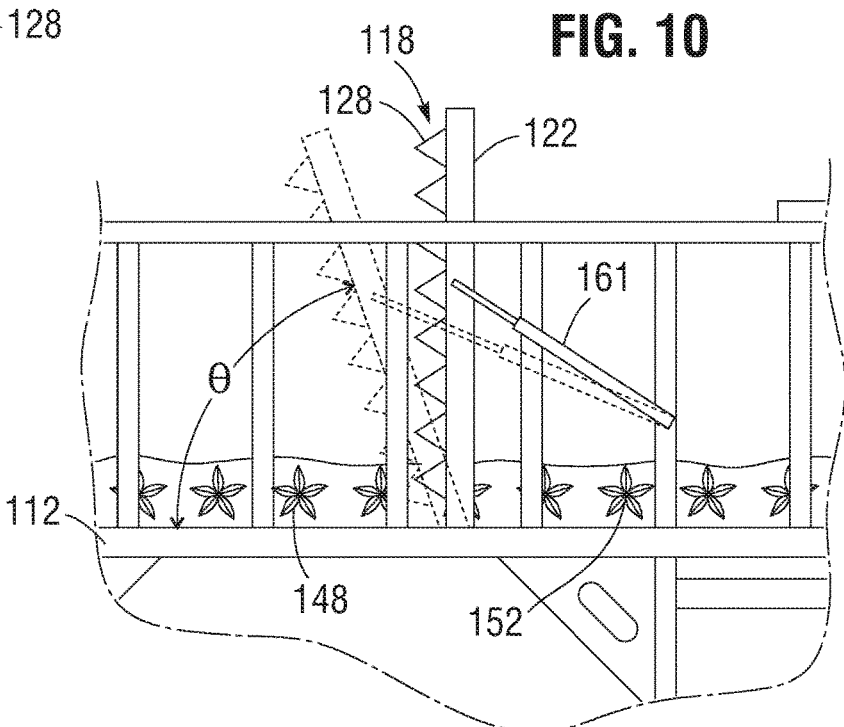
FIG. 10 is a side elevation view illustrating relative motion of the cutting assembly of FIG. 7 relative to a conveyor.

With reference to FIG. 10, one or more of the blade assemblies 120 (e.g., together with the frame 122 or a portion thereof) can be movable (e.g., pivotable or rotatable) relative to the plane of the conveyor 112 such that the blade assemblies form an angle θ with respect to the plane of the conveyor. In certain examples, pivoting motion of the frame 122 and/or the blade assemblies 120 can be effected by an actuator shown schematically in FIG. 10 and configured as a hydraulic arm 161. The hydraulic arm 161 can be coupled to an external frame structure of the machine 100 at one end, and to the frame 122 at the opposite end such that extension and retraction of the hydraulic arm causes corresponding pivoting motion of the frame 122, as illustrated in FIG. 10.

In some embodiments, movement of the frame 122 can allow the blade assemblies 120 to form an angle θ of from 30 degrees to 90 degrees with the plane of the conveyor. In some embodiments, the blade assemblies 120 can form an angle θ of from 45 degrees to 90 degrees with the plane of the conveyor. In some embodiments, the blade assemblies 120 can form an angle θ of 60 degrees with the plane of the conveyor. In this manner, the blade assemblies 120 can apply downward force to the hop vines 148 as they are cut by the blades. This can help the blade assemblies to cut hop vines that are incident on the blades as the hop vines are conveyed through the first cutting assembly and reduce the tendency for hop vines to pile up against the blade assemblies during operation. The angle θ can be selected prior to the introduction of hop vines into the machine, and/or adjusted during operation depending upon, for example, the amount or variety of hop vines being processed.

Figure 11:
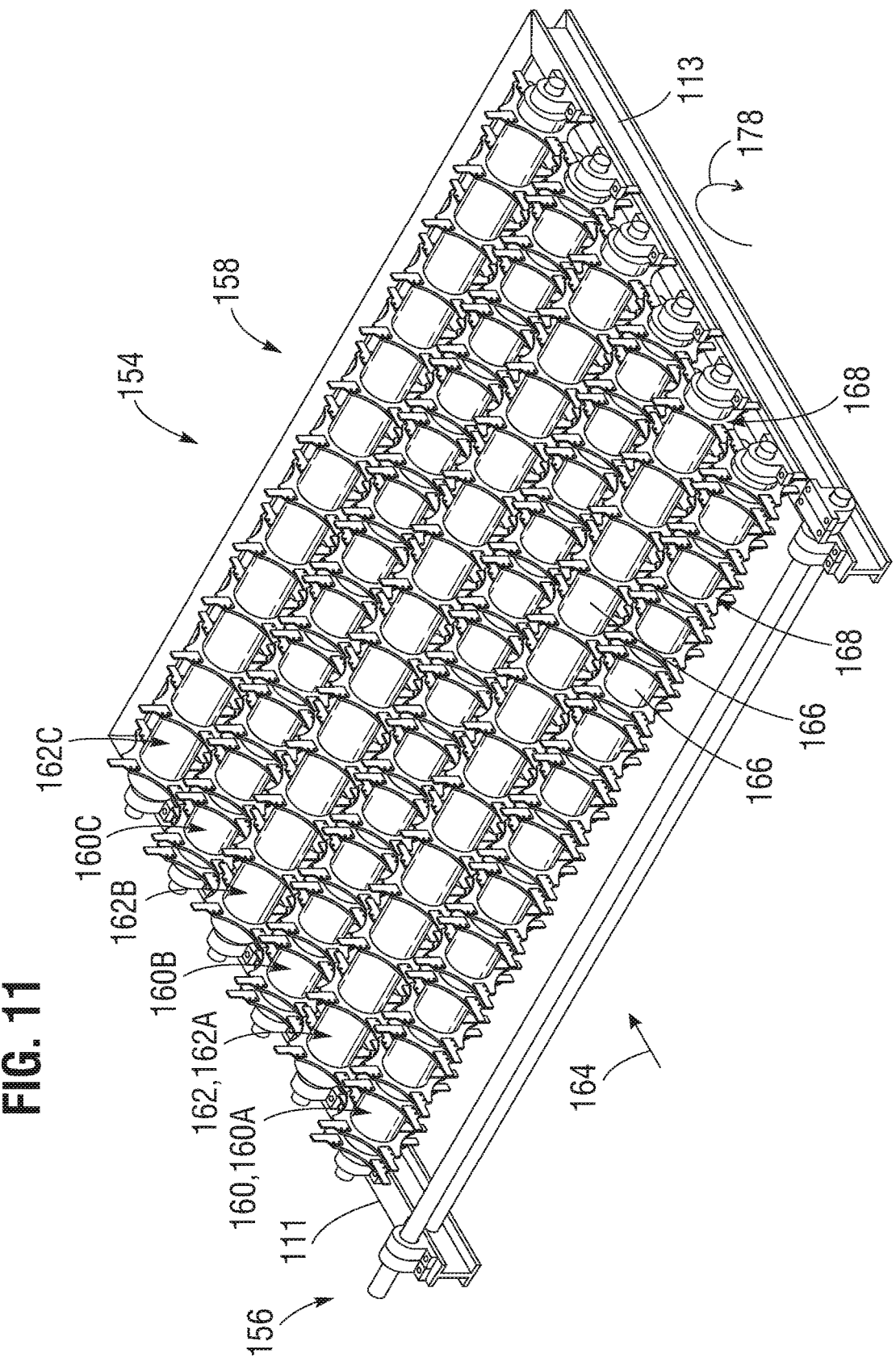
FIG. 11 is a perspective view of an embodiment of a cutting assembly including a plurality of rotatable cutting members.

Once the hop vines 148 have been cut into hop vine segments 152 by the first cutting assembly 118, the hop vine segments 152 can be conveyed (e.g., by the infeed conveyor 112) to a second cutting assembly 154 positioned after the first cutting assembly 118 along the direction of travel. With reference to FIGS. 4-6A and 11-15, the second cutting assembly 154 can comprise an inflow end 156 and an outflow end 158 (see FIGS. 4 and 11). As best shown in FIG. 11, the second cutting assembly 154 can include a plurality of first rotatable cutting members 160 alternatingly arranged with a plurality of second rotatable cutters 162. The first and second cutting members 160, 162 can extend transversely between frame members 111, 113. In the embodiment of FIG. 11, the second cutting assembly 154 includes three first rotatable cutting members 160A-160C arranged in an alternating fashion with three second rotatable cutting members 162A-162C. Hop vine segments entering the second cutting assembly 154 in the direction of arrow 164 encounter the first rotatable cutting member 160A, followed by the second rotatable cutting member 162A, followed by the first rotatable cutting member 160B, etc., until the hop vine segments are discharged at the outflow end 158.

Figure 12:
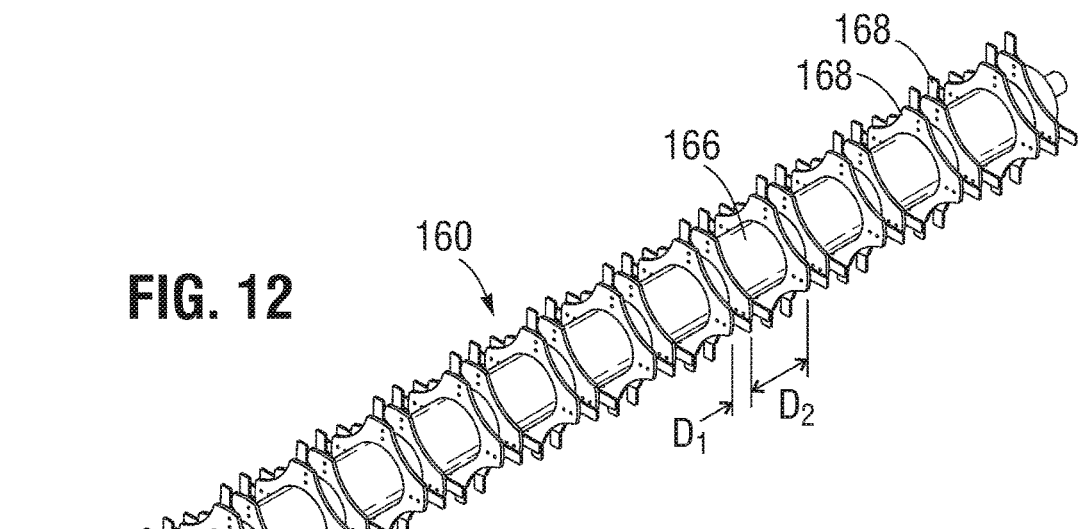
FIG. 12 is a perspective view of a first rotatable cutting member of the cutting assembly of FIG. 11.
Figure 13:
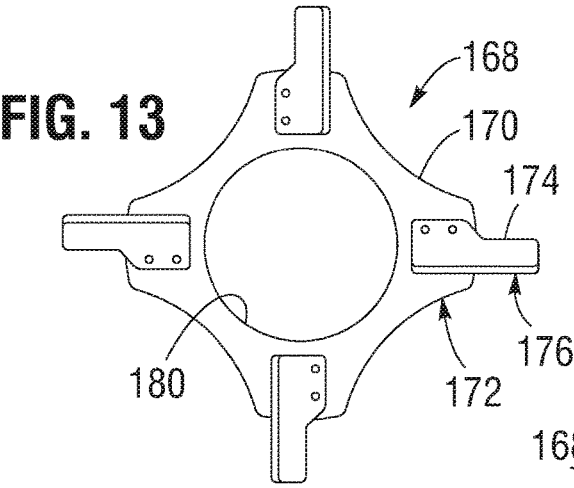
FIG. 13 is a side elevation view of an embodiment of a drum blade assembly.

Referring to FIGS. 11 and 12, the first rotatable cutting members 160A-160C can include rotatable members or drums 166 extending between the frame members 111, 113 and to which a plurality of drum blade assemblies 168 are secured. FIG. 13 illustrates a representative drum blade assembly 168 in greater detail. In the illustrated configuration, the drum blade assemblies 168 can include a mounting plate or disk 170 defining a central opening 180 and having four apical mounting portions 172 arrayed about the central opening. Blade members 174 can be secured to the mounting portions 172 by, for example, fasteners, with respective sharp edges 176 oriented in the direction of rotation of the drum 166 indicated by arrow 178 (FIG. 11). The drum 166 can be received through the opening 180 and the drum blade assemblies 168 can be secured to the drum 166 such that the drum blade assemblies rotate with the drum. In certain embodiments, the blade members 174 can be removable to, for example, sharpen or replace the blade. Additionally, it should be understood that the drum blade assemblies 168 can include any suitable number of blade members 174 depending upon the particular application. In other embodiments, the blades 174 can be integrally formed with the disk 170 such that the drum blade assemblies 168 are one-piece, unitary constructions.

Referring again to FIGS. 11 and 12, the first rotatable cutting members 160A-160C can include a plurality of drum blade assemblies 168 arranged in pairs. For example, in the embodiment of FIG. 12, the drum 166 can include 13 pairs of drum blade assemblies 168. The drum blade assemblies 168 of each pair of drum blade assemblies can be spaced apart from one another along a length of the drum by a first distance $D_1$. Respective pairs of drum blade assemblies 168 can be spaced apart from one another by a second distance $D_2$ (e.g., measured between opposing drum blade assemblies 168 of adjacent pairs of drum blade assemblies) that is greater than the first distance $D_1$. However, it should be understood that the first rotatable cutting members can include any suitable number of pairs of drum blade assemblies arranged in any suitable arrangement and with any suitable spacing.

Figure 14:
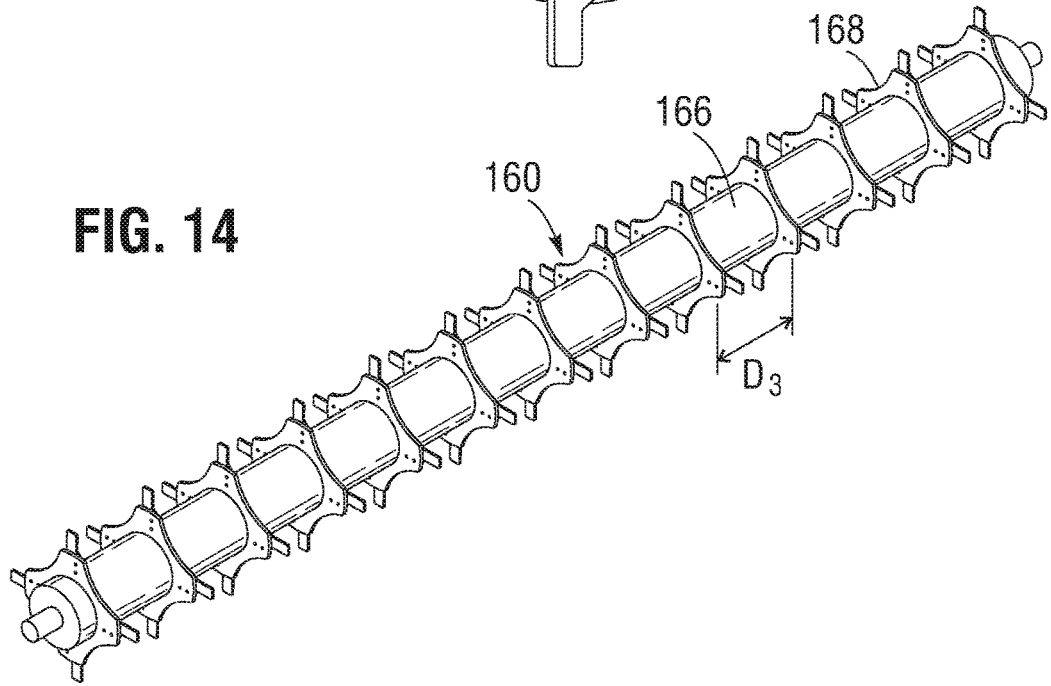
FIG. 14 is a perspective view of a second rotatable cutting member of the cutting assembly of FIG. 11.

Referring to FIGS. 11 and 14, the second rotatable cutting members 162A-162C can also include rotating members or drums 166 extending between the frame members 111, 113, and a plurality of drum blade assemblies 168 secured to the drums. The drum blade assemblies 168 can be spaced apart along the length of the drums 166 by a third distance $D_3$ (see FIG. 14). The distance $D_3$ can be such that when the first and second rotatable cutting members 160A-160C, 162A-162C are arranged in the second cutting assembly 154, the drum blade assemblies 168 of the second rotatable cutting members 162A-162C are positioned between the drum blade assemblies 168 of respective pairs of drum blade assemblies mounted to the first rotatable cutting members 160A-160C, as shown in FIGS. 11 and 15. The second rotatable cutting members 162A-162C can rotate in the same direction as the first rotatable cutting members 160A-160C (e.g., in the direction of arrow 178), or in the opposite direction, as desired.

Further, with reference to FIG. 11, the drums 166 of the first and second rotatable cutting members can be spaced apart such that at least a portion of the blade members 174 of the drum blade assemblies 168 of the second rotatable cutting members 162A-162C pass between the blade members of the respective pairs of drum blade assemblies of the adjacent first rotatable cutting members 160A-160C as the cutting members rotate. In other words, an arc swept by the blade members 174 of the second rotatable cutting members 162A-162C as the second rotatable cutting members rotate can overlap with an arc swept by the blade members of the respective adjacent first rotatable cutting members 160A-160C as the first rotatable cutting members rotate. In this manner, the blade members 174 of the second rotatable cutting members 162A-162C can pass between the blade members 174 of the respective pairs of drum blade assemblies 168 of the adjacent first rotatable cutting members. In this manner, the second cutting assembly 154 can further cut the hop vine segments received from the first cutting assembly and/or untangle or separate the hop vine segments in the bed from one another.

In some embodiments, the first and second rotatable cutting members 160A-160C, 162A-162C can rotate at different speeds. In this manner, hop vine segments can be held by the blade members of one rotatable cutting member (e.g., a first rotatable cutting member), and cut or separated from the bulk of hop vine segments by a blade member of an adjacent rotatable cutting member (e.g., a second cutting member) that is rotating at a higher speed. For example, in some embodiments, the second rotatable cutting members 162A-162C can rotate faster than the first rotatable cutting members 160A-160C. For instance, in some embodiments, the second rotatable cutting members 162A-162C can rotate 5% to 100% faster than the first rotatable cutting members 160A-160C. In some embodiments, the second rotatable cutting members 162A-162C can rotate 10% to 50% faster than the first rotatable cutting members 160A-160C. In a representative embodiment, the second rotatable cutting members 162A-162C can rotate 15% faster than the first rotatable cutting members 160A-160C. In other embodiments, certain first rotatable cutting members and/or second rotatable cutting members can rotate at different speeds from other first or second rotatable cutting members. In alternative embodiments, one or more first and/or second rotatable cutting members can be stationary, or can rotate in the opposite direction from the adjacent cutting members.

With reference to FIG. 27, in certain configurations the second cutting assembly 154 can be pivotable between a first or horizontal position (FIGS. 1 and 4) and a second or angled position in which the outflow end 158 is elevated relative to the inflow end 156. For example, in some embodiments the second cutting assembly 154 can comprise a frame 171 (e.g., including the frame members 111, 113) to which the cutting members 160A-160C and 162A-162C are mounted. The frame 171 can be pivotable about a mount 173 located adjacent the inflow end 156 such that the inflow end remains at or near the level of the infeed conveyor 112 when the frame is pivoted to the second position. The frame 171 can be pivoted between the first and second positions by one or more actuators, such as hydraulic cylinder 175, shown coupled to the frame adjacent the outflow end 158.

During operation, the second cutting assembly 154 can be pivoted such that the second cutting assembly is inclined relative to the infeed conveyor 112 by an angle φ of, for example, from 10 degrees to 60 degrees. In some embodiments, the angle φ can be from 30 degrees to 45 degrees. In particular embodiments, the second cutting assembly 154 can be inclined 45 degrees relative to the infeed conveyor 112. The angle of inclination of the second cutting assembly 154 can be selected prior to the introduction of hop vines into the machine, and/or actively adjusted during operation of the machine.

After the hop vine segments 152 are processed by the second cutting assembly 154, the hop vine segments 152 can be discharged from the second cutting assembly and conveyed to the hop harvesting portion 106 of the machine. For example, with reference to FIGS. 1-3, hop vine segments 152 can drop from the out flow end 158 of the second cutting portion 154 onto a conveyor 182. The conveyor 182 can convey the hop vine segments to the first in a series of hop cone picking assemblies 184 that separate the hop cones from the hop vine segments. With reference to FIG. 3, the conveyor 182 can be positioned beneath the first and the second cutting assemblies 118, 154 so that hop vine segments that fall from the cutting assemblies are received on the conveyor 182 and can be conveyed to the picking portion 106. In certain embodiments, the conveyor 182 can be a sorting conveyor made from a mesh such that hop cones separated from the hop vine segments when passing through the cutting assemblies can drop through the mesh of the conveyor 182, while the larger hop vine segments remain on the conveyor 182 and are conveyed to the picking portion 106.

Referring to FIGS. 2 and 3, a series of conveyors can extend along the lower portion of the machine beneath the conveyor 182. For example, in the illustrated embodiment hop cones that fall through the mesh of the conveyor 182 can be received onto another sorting conveyor 135. The sorting conveyor 135 can include a mesh with openings to further separate the hop cones from any hop vine segments or silage that may have fallen through the conveyor 182. The hop cones can then pass through the sorting conveyor 135 to one or more lower conveyors 137. The lower conveyors 137 can convey the hop cones to the discharge end of the apparatus, wherein the hop cones are received on conveyors 139 (see, e.g., FIGS. 2, 5, and 16) for transport to, for example, a cleaning apparatus for further processing. As shown in FIG. 16, the illustrated embodiment includes two conveyors 137 extending parallel to one another. However, it should be understood that the conveyors 137 can also be configured as a single conveyor, as desired. In other configurations, the machine need not include the second sorting conveyor 135 such that hop cones that fall through the sorting conveyor 182 can be received directly on the lower conveyor(s) 137.

In the illustrated embodiment, a leveling drum 129 is positioned adjacent the discharge end of the conveyor 182. The leveling drum 129 can include a plurality of leveling members 131, and can be configured to rotate such that the bed of hop vine segments is leveled to a predetermined height by the leveling drum 129 as vine segments pass beneath the leveling drum. In certain embodiments, the height of the leveling drum 129 can be adjustable to vary the amount of hop vine segments conveyed to the hop picking portion 106. In some embodiments, the conveyor 182 can be cleaned by a rotating paddle drum 143 (FIG. 3).

As best shown in FIG. 2, the conveyor 182 can be inclined relative to the ground, and can deliver hop vine segments to the picking portion 106 of the machine. In the illustrated embodiment, the conveyor 182 can discharge hop vine segments onto a conveyor 186 in the picking portion 106 and/or directly onto the first picking assembly 184 of the machine. The conveyor 186 can extend parallel to the ground, and along substantially the full length of the picking portion 106. The picking portion 106 can include six picking assemblies 184 schematically illustrated at FIGS. 2 and 16-18. The picking assemblies can be positioned above the conveyor 186 and configured as first picking assemblies 184A and second picking assemblies 184B. In the illustrated embodiment, the picking portion 106 includes five first picking assemblies 184A arranged sequentially along the length of the conveyor 186, and one second picking assembly 184B adjacent the discharge portion 108 of the machine, although it should be appreciated that the picking portion can include any suitable number of picking assemblies in any suitable configuration.

Referring to FIGS. 16-18, the first picking assemblies 184A can include a plurality of picking members or drums schematically illustrated at 188 and a plurality of retarder members schematically illustrated at 190. The picking drums 188 and the retarder members 190 can be rotatably coupled to respective frames 192, and can extend across the conveyor 186 perpendicular to the direction of travel of the conveyor. In the illustrated embodiment, the picking drums 188 and the retarder members 190 of each picking assembly 184A can be mounted in an inclined configuration. For example, each subsequent picking drum 188 and each subsequent retarder member 190 can be at a greater height above the conveyor 186 and laterally offset in the direction of travel from the preceding picking drum or retarder member. In the illustrated configuration, the retarder members 190 can be mounted above the respective picking members 188, and the rotational axes of the retarder members can be laterally offset from the rotational axes of the respective picking drums.

In the illustrated embodiment, the picking assemblies 184A can include five picking drums 188 and four retarder members 190, although other configurations are possible. The picking drums 188 can rotate in a clockwise direction as indicated by arrow 196 of FIG. 17. The retarder members 190 can rotate in a counter-clockwise direction, as indicated by arrow 198. The first picking drum 188 of each picking assembly 184A can be positioned such that hop vine segments discharged from the previous picking assembly can be received by the next picking assembly and travel through the picking assembly 184A from one picking drum to the next. In some embodiments, the first picking drum 188 can also be positioned adjacent the conveyor 186 such that hop vine segments on the conveyor can be picked up from the conveyor 186 by the first picking drum 188. The picking drums 188 can include a plurality of picking members or fingers 194 (see, e.g., FIG. 19). The picking fingers 194 can be spring-biased such that they deflect in a direction opposite to the direction of rotation of the drum picker to which they are mounted. The picking fingers 194 can be configured to engage and separate hop cones from the hop vine segments passing around the picking drum.

Figure 19:
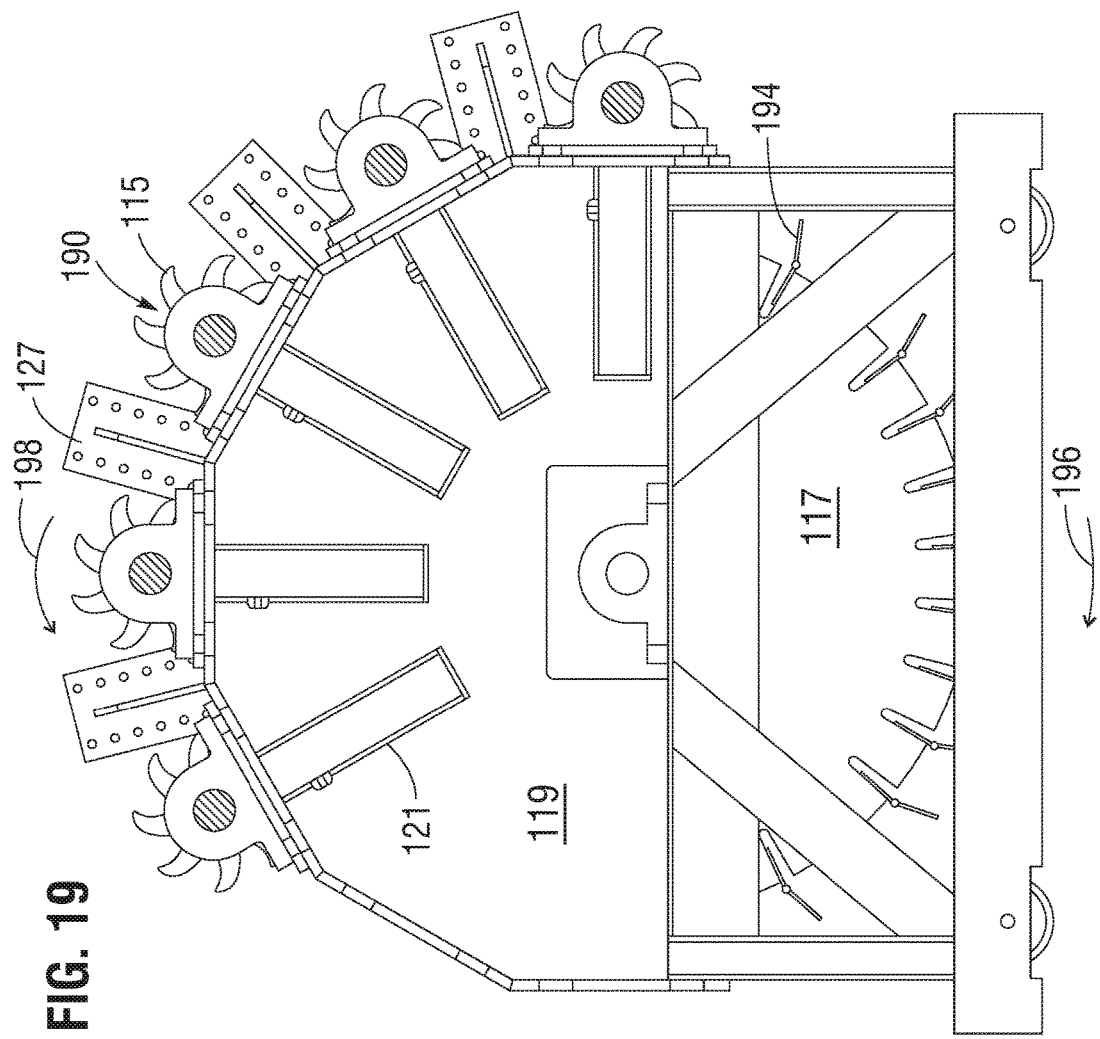
FIG. 19 is a side elevation view of a representative embodiment of a drum picker assembly.

The retarder members 190 can include a plurality of members or teeth 115 (FIG. 19). The teeth 115 can be mounted in sets along the length of the retarder members 190. As the retarder members rotate, the teeth 115 can be configured to scoop the hops and/or hop vine segments disposed on the drum picker below in a direction (e.g., counterclockwise) opposite to the direction of travel of the hops and vine segments around the drum pickers (e.g., clockwise). This can slow the progress of the hop vine segments around the drum pickers, allowing the drum pickers to separate a greater number of hop cones from the vine segments.

Referring to FIGS. 17 and 19-21, the second picking assembly 184B can include a drum picker 117 and a plurality of retarder members 190 circumferentially arrayed around the drum picker 117. In the illustrated embodiment, the drum picker 117 is larger than the drum pickers 188 of the preceding picking assemblies 184A. FIG. 19 illustrates the drum picker 117 in greater detail. The drum picker 117 can be disposed in a housing 119, and can include a plurality of picking fingers 194 as described above. The retarder members 190 can be adjustably mounted about the drum picker 117 on tubular mounts 121 such that the position of the retarder members can be adjusted relative to the surface of the drum picker. In some embodiments, the retarder members 190 of the other picking assemblies can also be positionally adjustable relative to the drum pickers, such that the position of the retarder members can be varied according to, for example, the number or weight of hop cones and vine segments passing through the drum picker.

Figure 20:
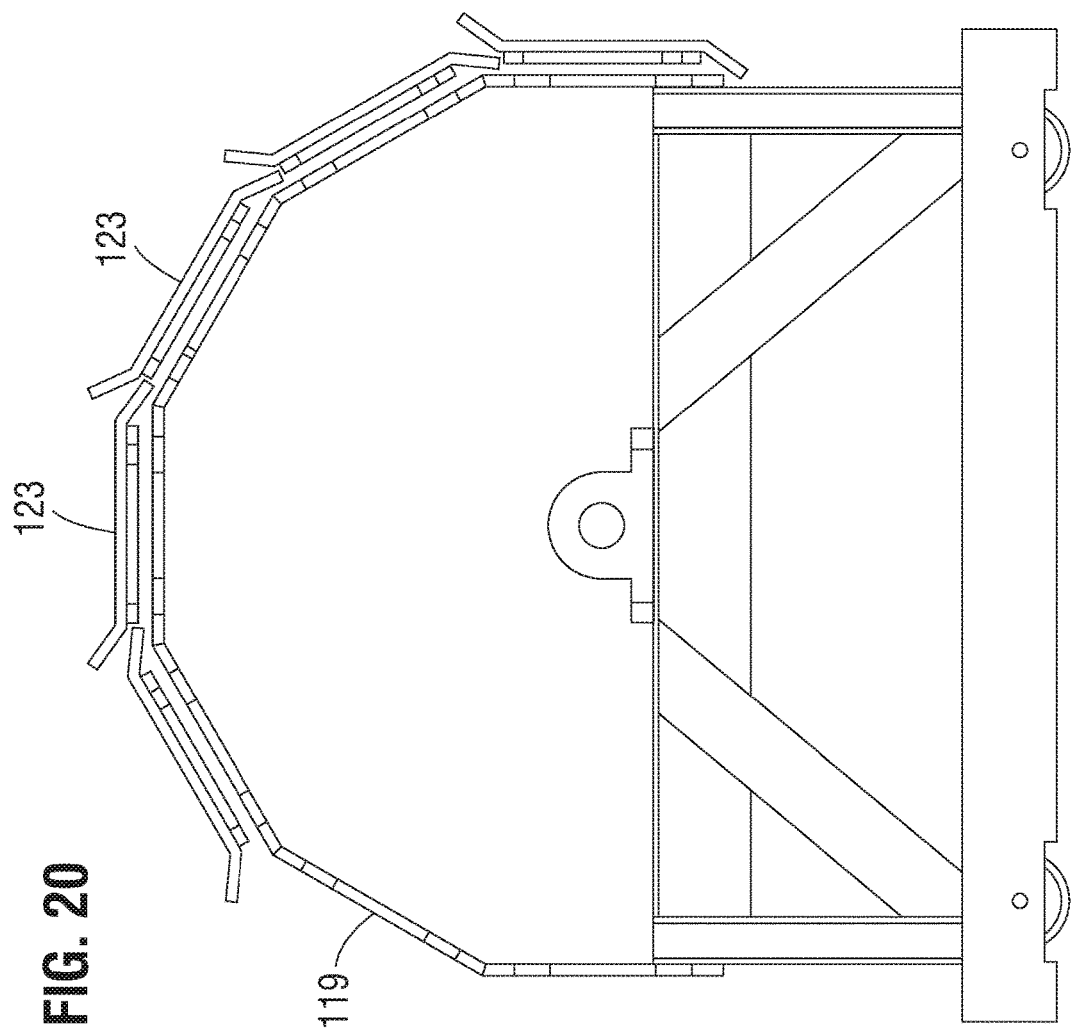
FIG. 20 is a side elevation view of the drum picker assembly of FIG. 19 including a plurality of shield members.
Figure 21:
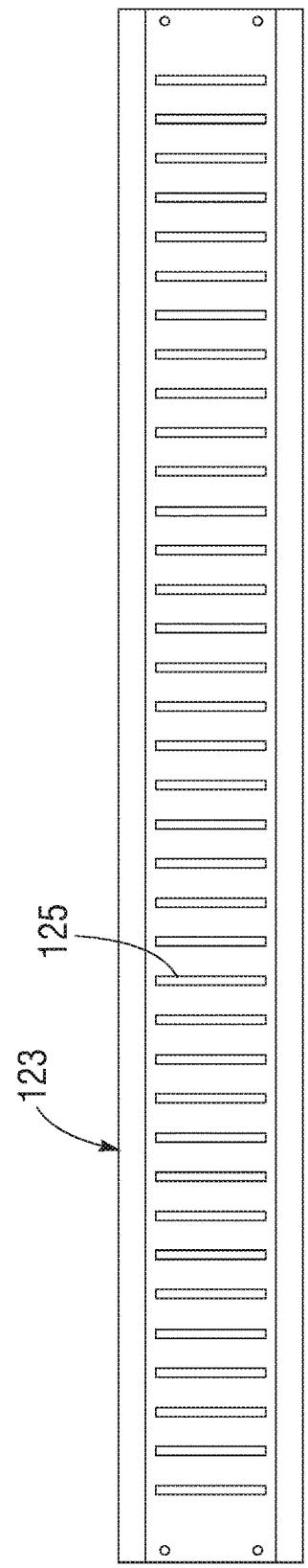
FIG. 21 is a top plan view of a representative embodiment of a shield member.

Referring still to FIGS. 17 and 19-21, the picking assembly 184B can include one or more shield members or panels 123 arrayed above the retarder members 190. FIG. 20 illustrates the housing 119 of the drum picker 117 with shield panels 123 arrayed about the housing and with the retarder drums 190 removed for purposes of illustration. FIG. 21 illustrates a plan view of a shield panel 123. The shield panels 123 can define a plurality of openings 125 through which the teeth 115 of the retarder members can pass as the retarder members rotate. The shield panels 123 can be configured to contain hop cones and/or vine segments within the picking assembly such that they fall through the picking assembly to the conveyor 186 and are not ejected from the top or sides of the picking assembly during operation.

The position of the shield panels 123 can also be adjustable relative to the retarder members 190. For example, the shield panels 123 can be adjustably mounted to bracket members 127 illustrated in FIG. 19. In this manner, the shield panels 123 can be raised or lowered relative to the retarder members 190 during operation in response to, for example, a weight or quantity of hop vine segments passing through the picking assembly. For example, in certain embodiments, the position of the shield panels 123 and/or the position of the retarder drums 190 can be adjusted in order to loosen or break up clusters of hops and/or vines that reach the picking assembly 184B. It should also be understood that any of the first and/or second picking assemblies 184A, 184B can include shield panels 123, as desired.

As discussed above, hop cones that are picked from the hop vine segments by the hop picking assemblies 184A, 184B can drop through the picking assemblies to the conveyor 186. The conveyor 186 can be a mesh sorting conveyor, and can separate the hop vine segments and other silage, and deposit the silage on a trash conveyor 145 at the discharge end of the machine. Meanwhile, hop cones can fall through the mesh of the conveyor 186, down through the lower portion of the conveyor 186, and then to the lower conveyors 137, from which the hop cones are discharged to the discharge conveyors 139 at the outflow end of the machine.

In some embodiments, the first and second picking assemblies 184A, 184B can be modular such that the hop picking machine can include any suitable number of picking assemblies of either configuration arranged in any suitable arrangement. For example some embodiments can include exclusively first picking assemblies 184A, or exclusively second picking assemblies 184B. The first and second picking assemblies can also be arranged in an alternating arrangement. Additionally, because the picking assemblies are modular, it is possible to add or remove picking assemblies from the machine as needed depending upon, for example, the variety of hops to be processed.

Referring again to FIG. 1, the apparatus 100 can include a controller schematically illustrated at 151. The controller 151 can be in communication with servos, motors, etc., coupled to the various conveyors, cutters, and adjustable mounts of the machine, and can control the various portions of the machine according to, for example, the weight and/or volume of hop vines passing through particular portions of the machine. Various embodiments of the controller are described in further detail below with reference to FIG. 23.

Turning now to the operation of the machine 100, harvested hop vines 148 can be delivered to the machine by, for example, tractors or trucks 147 (FIG. 5). In some embodiments, the hop vines 148 can be whole hop vines, and can be arranged in the bed of the truck such that the long axes 150 (see FIG. 6B) of the hop vines extend generally parallel to the longitudinal axis of the truck. The hop vines 148 can then be loaded onto the infeed conveyor 112 such that their long axes 150 are oriented perpendicular to the direction of motion of the conveyor, as described above. As the hop vines 148 are conveyed through the first cutting assembly 118, one or more sensors represented schematically at 153 can determine a quantity or throughput parameter associated with the amount of hop vines passing through the first cutting assembly, and transmit information of the quantity to the controller 151. In certain embodiments, the sensors 153 can be, for example, scales, optical sensors, or electrical current sensors associated with the first cutting assembly 118 (e.g., associated with a motor coupled to the first cutting assembly).

For example, where the sensors 153 are scales, the quantity or throughput parameter can be a weight of hop vines at the first cutting assembly. Where the sensors 153 are optical sensors, the throughput parameter can be, for example, a depth of the hop vine bed at the first cutting assembly. Where the sensors are electrical current sensors, the throughput parameter can be an amount of current drawn by the motor(s) operating the first cutting assembly. Different types of sensors can also be used in combination with one another to determine the amount of hop vines approaching or passing through the first cutting assembly. The second cutting assembly 154 can also include one or more sensors 157 (e.g., scales, optical sensors, current sensors on motors coupled to the second cutting assembly, etc.) in communication with the controller 151 and operable to monitor the amount of hop vine segments 152 approaching and/or passing through the second cutting assembly.

Based at least in part on or more of these parameters, the controller 151 can transmit control signals to control, for example, the speed of the infeed conveyor 112, the speed of the blade assemblies 120, the angle of the blade assemblies 120 relative to the plane of the infeed conveyor, a depth of the hop vine bed, and/or the speed of the drums 166. This can allow the controller 151 to facilitate movement of hop vines through the various portions of the machine at a specified rate. In certain embodiments, the picking portion 106 can also include sensors such as scales, optical sensors, current sensors, etc., in communication with the controller 151, which can vary the speed and/or position of the components of the picking assemblies 184, according to the amount of hop vine segments passing through the picking portion.

In certain embodiments, the controller 151 can also determine the variety of hop vines being processed by, for example, using optical sensors associated with the infeed conveyor or the first cutting assembly. The controller 151 can then adjust the operation (e.g., linear or rotational speed, position, etc.) of the various parts of the machine according to the variety of hop vines being processed. This can allow the machine to process different varieties of hops quickly and with reduced waste, damage to the hop cones, etc. Alternatively, the variety of hop vines being processed can be input to the controller 151 by an operator, and the controller can adjust the operating parameters of the various components of the hop picking machine accordingly.

The hop picking machine embodiments described herein can provide significant advantages over known methods and machines for picking and processing hops. For example, by arranging the blade assemblies 120 across the width of the infeed conveyor and orienting the hop vines with their longitudinal axes perpendicular to the direction of travel, the machine can process a continuous stream of hop vines. This can increase the speed and the amount of hop vines that can be processed, saving time and labor as compared to known systems, which frequently require that hop vines be processed in batches. Furthermore, cutting the vines into segments can reduce wrapping of the vines around the rotating components (e.g., drum pickers, etc.) of the machine, reducing binding and clogging of the machinery and associated maintenance. For example, the cutting assemblies can be configured to cut the hop vines into vine segments having lengths less than the diameters of the rotatable cutting members and/or the picking drums such that the vine segments do not become wrapped around them. In some embodiments, the hop picking machine can include a cat walk 155 (see FIGS. 2 and 5) to allow workers to access various portions of the machine.

Figure 22:
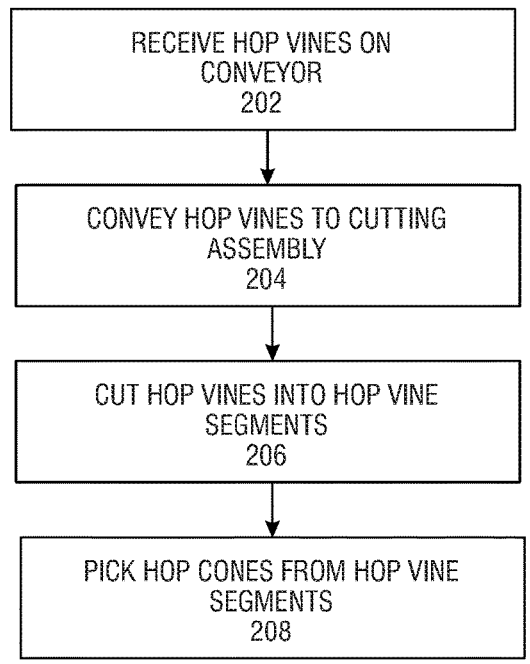
FIG. 22 is a process flow diagram illustrating a representative method of picking hops.

FIG. 22 is a process flow diagram illustrating a representative method of picking hops. At block 202, hop vines can be received on a conveyor, such as the infeed conveyor 118, such that long axes of the hop vines are oriented substantially perpendicular to a direction of travel of the conveyor.

At block 204, the hop vines can be conveyed along the conveyor to a cutting assembly.

At block 206, the hop vines can be cut into hop vine segments with the cutting assembly.

At block 208, hop cones can be picked from the hop vine segments with one or more picking assemblies.

Representative Computing Environment

Figure 23:
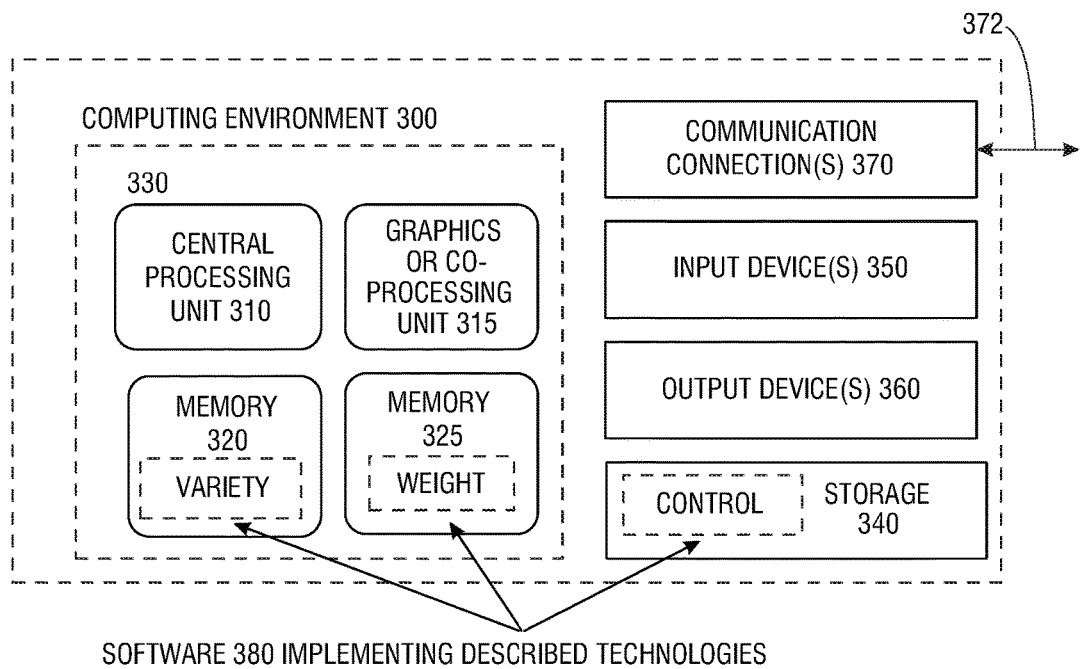
FIG. 23 is a schematic block diagram illustrating a representative computing environment.

FIG. 23 depicts a generalized example of a suitable computing environment 300 in which software and control algorithms for the described innovations may be implemented. The computing environment 300 is not intended to suggest any limitation as to scope of use or functionality, as the innovations may be implemented in diverse general-purpose or special-purpose computing systems. For example, the computing environment 300 can be any of a variety of computing devices (e.g., desktop computer, laptop computer, server computer, tablet computer, gaming system, mobile device, programmable automation controller, programmable logic controller, etc.).

With reference to FIG. 23, the computing environment 300 includes one or more processing units 310, 315 and memory 320, 325 (e.g., for storing data indicative of hop varieties, amounts or weights of hop vines passing through the machine, etc.). In FIG. 23, this basic configuration 330 is included within a dashed line. The processing units 310, 315 execute computer-executable instructions. A processing unit can be a general-purpose central processing unit (CPU), a processor in an application-specific integrated circuit (ASIC) or any other type of processor. In a multi-processing system, multiple processing units execute computer-executable instructions to increase processing power. For example, FIG. 23 shows a central processing unit 310 as well as a graphics processing unit or co-processing unit 315. The tangible memory 320, 325 may be volatile memory (e.g., registers, cache, RAM), non-volatile memory (e.g., ROM, EEPROM, flash memory, etc.), or some combination of the two, accessible by the processing unit(s). The memory 320, 325 stores software 380 implementing one or more innovations described herein, in the form of computer-executable instructions suitable for execution by the processing unit(s).

A computing system may have additional features. For example, in some embodiments, the computing environment 300 includes storage 340, one or more input devices 350, one or more output devices 360, and one or more communication connections 370. An interconnection mechanism (not shown) such as a bus, controller, or network, interconnects the components of the computing environment 300. Typically, operating system software (not shown) provides an operating environment for other software executing in the computing environment 300, and coordinates activities of the components of the computing environment 300.

The tangible storage 340 may be removable or non-removable, and includes magnetic disks, flash memory, CD-ROMs, DVDs, or any other medium that can be used to store information in a non-transitory way and can be accessed within the computing environment 300. The storage 340 stores instructions for the software 380 implementing one or more innovations described herein (e.g., for storing data of a velocity and direction of a UAV).

The input device(s) 350 may be, for example: a radio or optical receiver, a touch input device, such as a keyboard, mouse, pen, or trackball; a voice input device; a scanning device; any of various sensors; another device that provides input to the computing environment 300; or combinations thereof. For video encoding, the input device(s) 350 may be a camera, video card, TV tuner card, or similar device that accepts video input in analog or digital form, or a CD-ROM or CD-RW that reads video samples into the computing environment 300. The output device(s) 360 may be a radio or optical transmitter, a display, printer, speaker, CD-writer, or another device that provides output from the computing environment 300.

The communication connection(s) 370 enable communication over a communication medium to another computing entity represented by arrow 372. The communication medium conveys information, such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Any of the disclosed methods can be implemented as computer-executable instructions stored on one or more computer-readable storage media (e.g., one or more optical media discs, volatile memory components (such as DRAM or SRAM), or nonvolatile memory components (such as flash memory or hard drives)) and executed on a computer (e.g., any commercially available computer, including smart phones, other mobile devices that include computing hardware, or programmable automation controllers). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Second Representative Cutting Assembly

FIGS. 24-26 illustrate another configuration of a cutting assembly 400 that can be used in combination with the machine 100 at the cutting portion 104. The cutting assembly 400 includes a plurality of blade assemblies 402 mounted to a frame 404 and spaced apart from each other across the infeed conveyor 112, similar to the cutting assembly 118 above. The blade assemblies 402 can extend through openings 406 in the second portion 116 of the infeed conveyor 112. For example, in configurations in which the infeed conveyor 112 comprises a draper chain (not shown), the openings 406 can be defined in the surface on which the draper is supported and moves. In this manner, one or more draper chains can pass through the gaps between the blade assemblies 402 to move hop vines through and past the blade assemblies.

The frame 404 can be pivotable about a lower shaft 408 in the directions indicated by double-headed arrow 410, similar to the cutting assembly 118 above. Pivoting motion of the frame 404 and, hence, of the blade assemblies 402, can be effected by one or more actuators. For example, in the illustrated configuration the cutting assembly 400 can comprise hydraulic arms 412 coupled to the side members on one or both sides of the frame 404, as shown in FIG. 24.

In the illustrated embodiment, the blade assemblies 402 can be driven by respective drive assemblies 414 mounted to a cross-member 415 of the frame 404. FIGS. 25 and 26 illustrate a representative blade assembly 402 and associated drive assembly 414 in greater detail. The blade assemblies 402 can comprise two cutter bar members 416A, 416B, with each cutter bar member including a plurality of blades 418 arranged along its length in the manner of a sickle bar. The cutter bar members 416A, 416B can be received in a groove or channel 420 defined in a guide member 422. The cutter bar members 416A, 416B can be coupled to the drive assembly 414 by respective coupling members 424A, 424B.

The drive assembly 414 can include a motor 426 and an eccentric mechanism or mount 428 configured to convert rotary motion of the motor 426 to reciprocating motion of the cutter bar members 416A, 416B. The motor 426 can be coupled to the eccentric mechanism 428 by a shaft 430 via a reduction gearbox 432. The shaft 430 can be supported by the gearbox 432 at one end, and by a shaft bearing 448 (FIG. 26) at the opposite end. The eccentric mechanism 428 can comprise a two eccentric strap members 434A, 434B coupled to an eccentric sheave member 436 via respective roller bearings 438, 440. More particularly, the eccentric sheave member 436 can comprise two lobes 442, 444 on opposite sides of the sheave member 436 from each other. The lobes 442, 444 can also be radially offset from each other across the central axis of the sheave member. The strap member 434A can be coupled to the lobe 442 via the roller bearing 438, and the strap member 434B can be coupled to the lobe 444 via the roller bearing 440. Respective crank arms 446A, 446B can couple the strap members 434A, 434B to the respective coupling members 424A, 424B of the cutter bar members 416A, 416B (e.g., with pins). The drive assembly 414 can be coupled to the cross-member 415 of the frame by a mounting plate 450.

In operation, rotary motion can be transmitted from the motor 426 to the eccentric mount 428 by the reduction gearbox 432 and the shaft 430. Rotary motion of the shaft 430 can be converted to reciprocating longitudinal motion of the cutter bar members 416A, 416B by the eccentric sheave member 436 and the eccentric strap members 434A, 434B. In this manner, the eccentric mechanism 428 can drive the cutter bar members 416A, 416B in a reciprocating manner within the groove 420 of the guide member 422, as indicated by double-headed arrow 452. In the illustrated embodiment, the cutter bar members 416A, 416B can reciprocate 180 degrees out of phase with each other due to the radial offset of the lobes 442, 444. This can result in scissor-like motion of the blades 418 of the cutter bar member 416A relative to the blades 418 of the cutter bar member 416B.

It will be apparent that the embodiments disclosed provide a continuous feed system in which the vines are fed continuously to and through the first and second cutting assemblies. The infeed conveyor may be stopped to clear a jam or address equipment issues in the production line, but in general operation vines may be loaded continuously onto the infeed conveyor and fed continuously to the first cutting assembly 118.

At the first cutting assembly, the vines are continuously cut into shorter lengths by blade assemblies that move vertically and slightly forward and rearward in alignment with or at least parallel to the longitudinal axis of the infeed conveyor. The blade assemblies are supported at their upper ends by eccentric rotating mechanisms that reciprocate and pivot the blade assemblies in alignment with the long axis of the conveyor. The continuous cutting is possible because the vines are oriented cross-wise on the conveyor such that the vertical blade assemblies cut generally perpendicular across the width of the vines. As a result, the blade assemblies cut the vines continuously as they are fed to and through the cutting area. The blade assemblies do not have to use a cutting cycle in which the blades move across the vines to cut them into lengths and then recycle and reload for the next cutting stroke.

After the initial cutting step, the cut vines move horizontally along a flat portion to the second cutting assembly 154 or drum cutters where the vine segments are cut further and partially separated and/or untangled by variable speed rotating cutters.

General Considerations

For purposes of this description, certain aspects, advantages, and novel features of the embodiments of this disclosure are described herein. The disclosed methods, apparatus, and systems should not be construed as being limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one of ordinary skill in the art.

As used in this application and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

In some examples, values, procedures, or apparatus may be referred to as "lowest," "best," "minimum," or the like. It will be appreciated that such descriptions are intended to indicate that a selection among many alternatives can be made, and such selections need not be better, smaller, or otherwise preferable to other selections.

In the description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Unless otherwise indicated, all numbers expressing quantities of components, molecular weights, percentages, temperatures, times, and so forth, as used in the specification or claims are to be understood as being modified by the term "about." Accordingly, unless otherwise indicated, implicitly or explicitly, the numerical parameters set forth are approximations that can depend on the desired properties sought and/or limits of detection under test conditions/methods familiar to those of ordinary skill in the art. When directly and explicitly distinguishing embodiments from discussed prior art, the embodiment numbers are not approximates unless the word "about" is recited. Furthermore, not all alternatives recited herein are equivalents.

As used herein with respect to the orientation of the hop vines relative to the direction of travel of the conveyor, "substantially perpendicular" means that the longitudinal axes of the hop vines form an angle of 45 degrees to 90 degrees, 60 degrees to 90 degrees, 70 degrees to 90 degrees, 80 degrees to 90 degrees, or 85 degrees to 90 degrees with respect to the direction of travel of the conveyor.

As used herein with respect to the orientation of the blade assemblies 120 of the first cutting assembly 118, "substantially perpendicular" means that the longitudinal axes of the blade assemblies form an angle of 45 degrees to 90 degrees, 60 degrees to 90 degrees, 70 degrees to 90 degrees, or 80 degrees to 90 degrees with the plane of the conveyor at the location of the first cutting assembly.

In view of the many possible embodiments to which the principles of the disclosed technology may be applied, it should be recognized that the illustrated embodiments are only preferred examples and should not be taken as limiting the scope of the disclosure. Rather, the scope of the disclosure is at least as broad as the following claims.

The invention claimed is:

1. An apparatus, comprising:
a conveyor configured to receive hop vines;
a first cutting assembly including a plurality of blade assemblies spaced apart from one another across a width of the conveyor and extending upwardly relative to a plane of the conveyor, the blade assemblies including respective cutter bar members having blades mounted thereon such that the blades are oriented opposite to a direction of travel of the conveyor, and such that hop vines conveyed by the conveyor to the first cutting assembly can be cut by the blades; and
a second cutting assembly including a plurality of rotatable cutting members configured to receive hop vine segments from the first cutting assembly along the direction of travel of the conveyor, the second cutting assembly further comprising at least one first rotatable cutting member operable to rotate at a first speed, and at least one second rotatable cutting member operable to rotate at a second speed that is higher than the first speed, the first rotatable cutting member including drum blade assemblies arranged in pairs, the drum blade assemblies of each respective pair being spaced part from one another along a length of the first rotatable cutting member by a first distance;
wherein respective pairs of drum blade assemblies are spaced apart from one another along the length of the first rotatable cutting member by a second distance that is greater than the first distance.

2. The apparatus of claim 1, wherein the blade assemblies of the first cutting assembly are positionable relative to the plane of the conveyor such that the blade assemblies are capable of forming an angle of from 45 degrees to 90 degrees with the plane of the conveyor.

3. The apparatus of claim 1, wherein the cutter bar members of the first cutting assembly are operable to reciprocate along respective longitudinal axes of the cutter bar members.

4. The apparatus of claim 3, wherein:
each of the blade assemblies of the first cutting assembly comprises two cutter bar members; and
the cutter bar members of each blade assembly are coupled to an eccentric drive mechanism configured to produce reciprocating motion of the cutter bar members along the longitudinal axes of the cutter bar members.

5. The apparatus of claim 1, wherein the cutter bar members of the first cutting assembly are sickle bars.

6. The apparatus of claim 1, wherein the second rotatable cutting member includes a plurality of drum blade assemblies spaced apart from one another along a length of the second rotatable cutting member such that the drum blade assemblies of the second rotatable cutting member are positioned between the drum blade assemblies of respective pairs of drum blade assemblies of the first rotatable cutting member.

7. The apparatus of claim 1, further comprising at least one picking assembly configured to receive hop vine segments from the second cutting assembly.

8. A method, comprising:
receiving hop vines on a conveyor configured to receive hop vines such that longitudinal axes of the hop vines are oriented substantially perpendicular to a direction of travel of the conveyor;
conveying the hop vines along the conveyor to a first cutting assembly including a plurality of blade assemblies spaced apart from one another across a width of the conveyor and extending upwardly relative to a plane of the conveyor, the blade assemblies including respective cutter bar members having blades mounted thereon such that the blades are oriented opposite to a direction of travel of the conveyor, and such that hop vines conveyed by the conveyor to the first cutting assembly can be cut by the blades;
with the first cutting assembly, cutting the hop vines along the longitudinal axes of the hop vines into hop vine segments;
cutting at least a portion of the hop vine segments with a second cutting assembly including a plurality of rotatable cutting members configured to receive hop vine segments from the first cutting assembly along the direction of travel of the conveyor, the second cutting assembly further comprising at least one first rotatable cutting member operable to rotate at a first speed, and at least one second rotatable cutting member operable to rotate at a second speed that is higher than the first speed, the first rotatable cutting member including drum blade assemblies arranged in pairs, the drum blade assemblies of each respective pair being spaced part from one another along a length of the first rotatable cutting member by a first distance, wherein respective pairs of drum blade assemblies are spaced apart from one another along the length of the first rotatable cutting member by a second distance that is greater than the first distance; and
picking hop cones from the hop vine segments with one or more picking assemblies.

9. The method of claim 8, further comprising positioning the blade assemblies of the first cutting assembly such that the blade assemblies form an angle of from 45 degrees to 90 degrees with respect to the plane of the conveyor.

10. The method of claim 8, wherein
cutting the hop vines further comprises moving the cutter bar members of the blade assemblies in a reciprocating motion.

11. The method of claim 8, further comprising controlling a speed of the conveyor based at least in part on a throughput parameter associated with the first cutting assembly.

12. The method of claim 11, further comprising determining the throughput parameter using one or more of scales, optical sensors, or electrical current sensors associated with the first cutting assembly.

13. The method of claim 8, wherein
cutting the hop vine segments with the second cutting assembly further comprises rotating the plurality of rotatable cutting members.

14. One or more non-transitory computer-readable storage media storing computer executable instructions for causing a computer to perform the method of claim 8.

15. A system, comprising:
a conveyor configured to receive hop vines;
a first cutting assembly including a plurality of blade assemblies spaced apart from one another across a width of the conveyor and extending upwardly from a plane of the conveyor, the blade assemblies including respective cutter bar members having blades mounted thereon such that the blades are oriented opposite to a direction of travel of the conveyor, and such that hop vines conveyed by the conveyor to the first cutting assembly can be cut by the blades;
a second cutting assembly including a plurality of rotatable cutting members configured to receive hop vine segments from the first cutting assembly along the direction of travel of the conveyor, the second cutting assembly further comprising at least one first rotatable cutting member operable to rotate at a first speed, and at least one second rotatable cutting member operable to rotate at a second speed that is higher than the first speed, the first rotatable cutting member including drum blade assemblies arranged in pairs, the drum blade assemblies of each respective pair being spaced part from one another along a length of the first rotatable cutting member by a first distance, wherein respective pairs of drum blade assemblies are spaced apart from one another along the length of the first rotatable cutting member by a second distance that is greater than the first distance; and
a controller operable to:
transmit control signals to cause the conveyor to convey hop vines along the direction of travel to the first cutting assembly;
transmit control signals to cause the first cutting assembly to cut the hop vines along longitudinal axes of the hop vines into hop vine segments; and
transmit control signals to cause the rotatable cutting members of the second cutting assembly to cut at least a portion of the hop vine segments.

* * * * *